(12) United States Patent
Fine et al.

(10) Patent No.: US 10,650,430 B2
(45) Date of Patent: May 12, 2020

(54) CONTENT CURATION AND PRODUCT LINKING SYSTEM AND METHOD

(71) Applicant: Mediander LLC, New York, NY (US)

(72) Inventors: Michael J. Fine, New York, NY (US); Jesse Erlbaum, New York, NY (US)

(73) Assignee: Mediander LLC, New York, NY (US)

( * ) Notice: Subject to any disclaimer, the term of this patent is extended or adjusted under 35 U.S.C. 154(b) by 1428 days.

(21) Appl. No.: 13/947,029

(22) Filed: Jul. 20, 2013

(65) Prior Publication Data

US 2014/0279257 A1 Sep. 18, 2014

Related U.S. Application Data

(60) Provisional application No. 61/800,355, filed on Mar. 15, 2013.

(51) Int. Cl.
*G06F 16/00* (2019.01)
*G06Q 30/06* (2012.01)

(52) U.S. Cl.
CPC .............................. *G06Q 30/0625* (2013.01)

(58) Field of Classification Search
CPC ..................... G06F 17/30749; G06F 17/30761
USPC ........................................ 707/771, 772, 773
See application file for complete search history.

(56) References Cited

U.S. PATENT DOCUMENTS

| | | | | |
|---|---|---|---|---|
| 2002/0133726 A1* | 9/2002 | Kawamae | ......... | G06F 17/30867 713/300 |
| 2005/0210507 A1* | 9/2005 | Hawkins | ........... | G06F 17/30035 725/46 |
| 2006/0026152 A1* | 2/2006 | Zeng | ................. | G06F 17/30864 |
| 2007/0265926 A1* | 11/2007 | Ohmann | ................ | G06Q 30/02 705/14.51 |
| 2008/0140616 A1* | 6/2008 | Encina | ............. | G06F 17/30613 |
| 2009/0150436 A1* | 6/2009 | Godbole | ............ | G06F 17/3071 |
| 2011/0197143 A1* | 8/2011 | Baszucki | ................ | A63F 13/79 715/745 |
| 2012/0254163 A1* | 10/2012 | Bandyopadhyay | ......................... | G06F 17/30979 707/723 |
| 2012/0271825 A1* | 10/2012 | Garthwaite | ....... | G06F 17/30817 707/736 |
| 2013/0073382 A1* | 3/2013 | Henkin | .................. | G06Q 30/02 705/14.49 |
| 2014/0046924 A1* | 2/2014 | Bandyopadhyay | ......................... | G06F 17/30979 707/706 |
| 2014/0229450 A1* | 8/2014 | Brekelmans | ...... | G06F 17/30867 707/691 |

(Continued)

*Primary Examiner* — Son T Hoang
(74) *Attorney, Agent, or Firm* — Kaplan Breyer Schwarz, LLP

(57) ABSTRACT

A computer-implemented method of operating a user-searchable database system of curated, themed digital content data, which method includes operating a Connects function to process and store heterogeneous digital content comprising topic data as curated topic data and identified connections between each topic and other topics, and operating a user interface to enable users to search the curated topics and present a search results page in a way that invites further investigation of topics searched, including a list or compilation of topics matching terms defining the search. The method also includes displaying topic elements corresponding to the list or compilation of matching topics in prioritized order based on each topic's relatedness to the search.

31 Claims, 22 Drawing Sheets

(56) References Cited

U.S. PATENT DOCUMENTS

2016/0188606 A1* 6/2016 Bandyopadhyay ......................... G06F 17/30979
707/706

* cited by examiner

CONTENT CURATION AND PRODUCT LINKING SYSTEM AND METHOD

CROSS-REFERENCE TO RELATED APPLICATIONS

The invention described and claimed hereinbelow claims priority under 35 USC § 120 from U.S. Provisional Patent Application 61/800,355 filed Mar. 15, 2013, which is incorporated by reference herein.

BACKGROUND OF THE INVENTION

The present invention relates to the preparation and operation of a user-searchable database system that employs a unique user interface configured to enable system (database) access, for example, to receive queries to search stored curated topic content data (cultural content, for example) and present query search results pages (and related pages), including related curated topic data, in a screen environment that invites and enables a user's further investigation of the search results and of editorially curated relationships between curated topics organized into interconnected groupings, or themed subjects. The themed subjects are depicted as graphical representations configured to facilitate access to textual (joining) descriptions of the editorially curated relationships therein. The joining descriptions as well as product data, links to product data, etc., are stored and recalled at run time for display in various forms.

Systems and methods for curating and distributing digital content, such as digital video, music, pictures, etc., are known. For example, US Published Patent Application No. 2012/0271825, to Garthwaite, et al. (Garthwaite) discloses a system and method of presenting a digital content program with continuously provided digital assets streamed over a digital content platform. Garthwaite defines assets as any machine-readable and/or machine storable files containing digital content or a pointer or placeholder, URL or equivalent means for redirecting an end user to the digital content (sometimes referred to as linking or hyperlinking). Digital content includes any digital video, music, pictures (images), etc. Users search the asset library based on tags, keywords and metadata linked to the asset itself.

So, Garthwaite processes data to populate storage with digital content files, or links to same and realizes a list or library indexing same. Garthwaite presents a list of assets in a form of interactive data records that, when activated, link to the asset itself for direct download.

Garthwaite does this (curating the digital content called assets) using a programming engine. The system then, in response to a search query, selects a subset of the assets from the entire aggregate of the curated assets based on similarity metrics (as between the assets) and orders the subset of assets into the digital content program. The selected assets are processed through a similarity metrics engine or re-ranking engine prior to distribution. The similarity metrics engine orders groups of assets based on inputs from a content graph, a filter, a term frequency-inverse document frequency module, and a trending analysis module in any combination.

Garthwaite's digital content system and method, however, merely presents users with a list of assets related to the user's query that links the user to the asset. There is absolutely no context returned with any asset—the processing, searching and linking to the multimedia product appears to be for business purposes only.

SUMMARY OF THE INVENTION

The present invention provides a user-searchable database of curated content and a system and method of operating the system that overcomes the shortcomings of the known related and previous arts.

In an embodiment, the invention includes a computer-implemented method of operating a user-searchable database system of curated, themed digital content data. The method includes steps of processing and storing heterogeneous digital content data as a collection of curated topics, including data identifying connections defining a degree of relatedness between each topic and other topics; operating an interface to enable users to search the curated topics and generate search results; and rendering a search results page including a list of matching topics, embodied as topic screen elements, in a prioritized order of presentation based on a degree of relatedness of the topic content of each of the topic screen elements to the search query, wherein each of the topic screen elements are displayed with some part of the respective topic's stored content and, interactive links, including a link to a list or compilation of the other topics based on the connections.

The interactive links within the topic screen elements include a link, and wherein activating the link renders a page presenting a list or compilation of product data preferably displayed in a prioritized order reflecting the degree of relatedness to the topic, and once expanded, to the topic and to the topic's connected topics. The interactive links within the topic screen elements also include links to themed subjects related to the topic screen element.

The method preferably further comprises preparing and storing themed subjects, wherein each of the themed subjects embodies a description of the themed subject and the editorially curated relationships among a subset of connected topics. The step of rendering includes presenting a page displaying a themed subject in a way that communicates the themed subject's editorially curated relationships, using a graphical representation. The editorially curated relationships included in the graphical representation of a themed subject comprise links to texts describing the editorially curated relationships between the connected topic pairs comprising the themed subjects. The rendered themed subjects are presented with links to relevant product data.

The step of rendering the search results page includes presenting links to other data including multimedia data, if available. For example, the step of rendering the search results page includes a list of links to themed subjects ranked by degree of relatedness to the user's search term, and product data, embodied as product data screen elements, listed in a prioritized order based on a degree of relatedness of the product data to the search. For that matter, the product data are presented as screen elements and wherein the product screen elements actively link to a process or function for purchasing the product associated with the product screen element.

In another embodiment, the invention includes a computer-implemented method of operating a user-searchable database system of curated, themed digital content data. The method includes steps of operating a Connects function to process and store heterogeneous digital content comprising topic data as curated topic data and identified connections between each topic and other topics; operating a user interface to enable users to search the curated topics and present a search results page with search results in a way that invites further investigation of topics searched, including a list or compilation of topics matching terms defining the search; and displaying topic elements corresponding to the list or compilation of matching topics in prioritized order based on each of the topics' relatedness to the search.

The connections between topics include a relatedness ranking or score between the topic and the other topics. The Connects function operates a Connects database with topical data records corresponding to each of the stored curated topics and the connections of each topic to the other topics related thereto. Preferably, the Connects function generates one Shop for each curated topic, and wherein each Shop comprises a list or compilation of product data associated with a topic and its connected topics.

A Shops function generates product data screen elements for each product of a Shop, wherein the user interface displays the product screen elements. The Shop can be a Shop based on a relatedness of products to the search, a Shop based on relatedness to a disambiguated Connects topic and a Shop based on relatedness to the topics within a themed subject. The Shops are displayed in window-like Shop screen elements, in a displayed page, that upon activation by a user cause a products purchase page to be presented that enables users to purchase a product associated with a Shop screen element.

The method also includes preparing and storing a list of themed subjects embodying descriptions of the themed subjects and of the editorially curated relationships among the topics comprising the themed subjects. The themed subjects are prepared from a themed editorial perspective and the editorial perspective defines a theme of the database system configured with the themed subjects. Alternatively, the themed subjects are presented as graphical depictions of the relatedness between topics included in each of the themed subjects.

The graphical representations of the themed subjects include connective elements linking topics of a themed subject, and wherein the linking of topics is two-by-two. For that matter, the connective elements, upon activation, present a textual description of an editorially curated relationship or connection between the two topics, and the user interface provides for displaying a home page to receive the user search queries and to present a daily feature element within which links to topics, themed subjects, Shops and product data are presented as individual screen elements within the daily feature element. The method may include a change element within the daily feature element that enables the user to navigate sequentially through thematically related sets of the individual screen elements.

The method may further include presenting links in rendered pages to social media websites and/or application program interfaces to enable users to share search results including themed subjects. The method may further include a step of presenting links to social networking sites or processes that enable users to upload curated topic data as well as themed subjects and graphical representations related thereto.

The inventive methods may embody a computer program product comprising program code means stored on a non-transitory computer-readable storage medium, for carrying out all steps of the method when the computer program product is run on a computer or processor-driven device. For that matter, the invention may comprise a database system with a processor; a memory; and an interface enabling communication by and with the database system, where the memory includes a set of computer-readable instructions that upon execution by the process implements the method of operating the database system.

In another embodiment, the invention includes a database system. The database system comprises a Connects function configured to process imported topic content data to realize stored, indexed topic data records, including topic data content, topic connections data and rankings or scores defining a relatedness between the topical data content comprising the topical data records; a user interface function configured to receive users' search queries to search the indexed topic data records, in cooperation with the topic Connects data and rankings or scores associated with the topical data records by the Connects function and, to present search results in a screen environment that invites and enables the user's further investigation of the search results; a ThemedSubjects function configured to select any of a set of pre-prepared themed subjects stored as themed subject records that embody descriptions of editorially curated relationships between a particular subset of topics; and a Shops function configured to select product data stored as product records or product metadata, in association with a topic or themed subject.

The user interface presents the topics, themed subjects and product data as screen elements with active links in various pages generated at run time. The screen elements include active links to social media websites through which particular topics, themed subjects and product data can be uploaded for sharing and/or public viewing. For that matter, the themed subjects are pre-prepared to define a perspective on the subset of topics and wherein the perspective defines a theme for a system configured to operate with the themed subjects.

BRIEF DESCRIPTION OF THE DRAWING FIGURES

The present invention can best be understood by reference to the accompanying drawings. It is noted that the invention is not limited to the precise embodiments shown in drawings, in which:

FIG. 1 presents a system-level diagram depicting a server (and memory) operating the inventive method across the Internet;

FIG. 2 depicts one embodiment of the invention;

FIG. 3. depicts an embodiment of a home page with two primary screen elements;

DETAILED DESCRIPTION OF THE INVENTION

Figure 1:
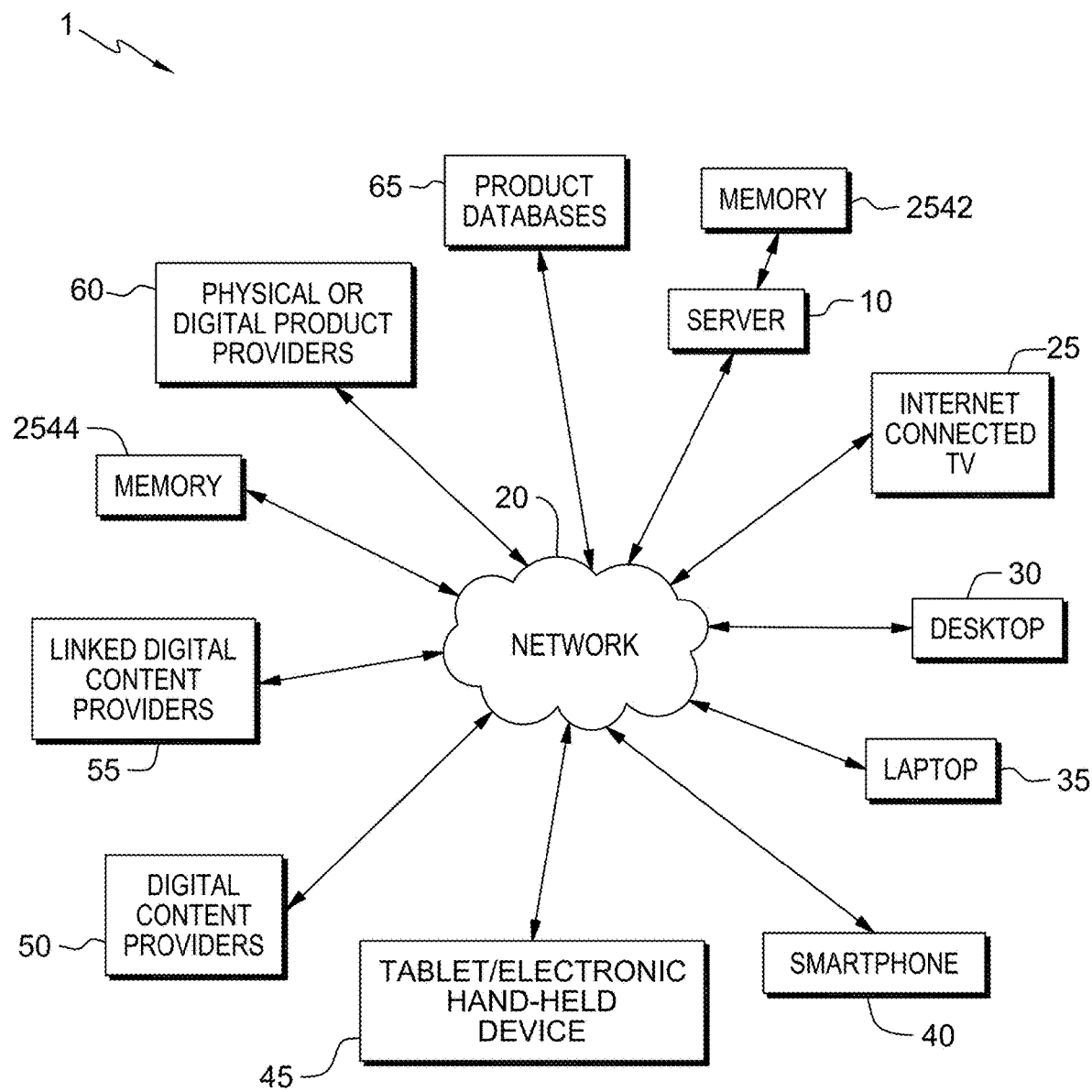

The following is a detailed description of example embodiments of the invention depicted in the accompanying drawings. The example embodiments are in such detail as to clearly communicate the invention, and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

In an embodiment, the invention provides a database system that is configured to process available topic-defined content, to realize curated content data (records) comprising the topics and data defining the (main) topic's connections to other topics. Further, the system provides a unique user interface configured to receive queries to search the curated topic content data (cultural content, for example), editorially created themed subjects, and product data, and to present search results pages, including related curated topic data, themed subjects data, and product data, in a screen environment that invites and enables a user's further investigation of the search results via links to other pages within the site. The themed subjects are comprised of editorially curated relationships between curated topics and are depicted as graphical representations configured to facilitate the display of textual (joining) descriptions of same. The joining descriptions as well as product data, links to product data and online videos, etc. are stored for recall and display at run time.

A connection in Connects (see FIGS. 4, 10 and 14) is defined by a link between two topics. The system and method control the WIKIPEDIAMINER engine (open source software in the preferred embodiment) to analyze the links between the topics and determine a relative ranking of connected topics for each main (query) topic. The relatedness rules are within the WIKIPEDIAMINER engine and enhanced by the inventive processes herein. The Connects connections between topics are defined by rules. Such connections between topics are based on reading and ranking the known relationships among topics rather than any evaluation of any attribute of the topics themselves, such as category or type.

As used herein, a curated topic means that the topic has been altered from its original state according to the method and system described in this patent. For example, non-curated topical information is taken into the described system and, after the application of the method, is enhanced in a way such that topics and the connections between topics are known and become operative.

At run time (for example, in response to a search query), various pages are created that include the content, for example, parts of curated topic records with certain relatedness to the search query. These topic data records are presented in (or as) topic screen elements which each contain an active link to the full topical data record, active links to themed subjects (presented as graphical representations) related to the linked-from topic screen element, and preferably, an active link to product data associated with the linked-from topic screen element. Preferably, a list of records related thematically to the subject matter of the search query (in the form of themed subject screen elements) and, a list of records describing products related to the query (in the form of product screen elements), or both are displayed concurrently with the list of topical records (topic screen elements).

The curated, stored topic data records include topical textual content, connection data (for example, a list of all topic records connected to a given topic record), and links to other data (that may or may not be stored), and metadata. At run time, various pages are created with topic elements, where each topic element includes, for example, some part of the stored topic data records. For example, a search page is rendered in response to a search query (at run time) and displays topic screen elements related to the query; or, for example, a (main) topic record page is rendered for a topic data record that displays topic screen elements (for topic data records) that are connected to the (main) topic data record. Links to other topic content, such as image or video data (which are not memory-stored) are also presented in the rendered pages.

The themed subjects comprise theme-related narratives, essays, explanations, etc., as well as data defining topics and relatedness between topics ("joining descriptions"); the themed subjects are proprietary and are stored in a Themed-Subjects database, which is managed by the ThemedSubjects function. In one page, for example, a search query results page, portions of themed subjects (derived from the stored records), are recalled and rendered as window-like screen elements to enable a user (by clicking on one of the displayed themed subject elements) to navigate to a graphical representation of the themed subject. For that matter, FIG. 5, which is described in detail below, presents a themed subject as a graphical representation.

The graphical representations of the themed subjects depict the topics included in same and their interrelatedness. The joining descriptions are editorially prepared to describe editorially curated relationships between the topics, the interrelatedness of which substantiates the "theme" of any one of the themed subjects. The themed subjects, and in particular, the joining descriptions of the topics therein, comprise proprietary data and, as presented via the user interface at run time, likely include links to YOUTUBE videos, and stored or linked product data and images.

The method of operating the database system is implemented in software on a computer-based electronic device, for example, a web server. The server operates a web service, which provides the user interface and user's access to the database system and curated content, thereby. Available content data are imported (downloaded). One source of topic content processed to configure the database system is WIKIPEDIA. Once downloaded, the imported data content is processed using WIKIPEDIAMINER tools, under control of a Connects function (210; FIG. 1; see below). WIKIPEDIAMINER is a toolkit that operates to provide simple, object-oriented access to WIKIPEDIA's structure and content and to measure connectedness between articles (topics) in WIKIPEDIA.

In greater detail, WIKIPEDIAMINER is utilized to calculate and weigh relations between WIKIPEDIA topics. The calculation is based on metrics using inbound and outbound link counts. Additionally, selected information is extracted for each topic, including the canonical topic name, the infobox name and the first paragraph. Technically this process involves the creation of intermediate comma separated values (CSV) files by running a Hadoop process on AMAZON EMR (Elastic Map Reduce). This involves 17 m2.xlarge Amazon's elastic compute cloud (EC2) instances, running for roughly 5 hours. This amount of time is bound to increase as the number of WIKIPEDIA topics increases (first step).

The first step includes:
a) Downloading a WIKIPEDIA dump from the WIKIPEDIA site.
b) Starting the WIKIPEDIAMINER Hadoop process using Amazon's EMR service. Please note that this process starts two controller and 14 task EC2 instances which do the heavy lifting of generating the intermediate CSV files using the open source MapReduce algorithm developed by GOOGLE.
c) The resulting CSV files are copied to an elastic block storage (EBS) volume.

A second step uses these intermediate CSV files to calculate the topic relations, which requires approximately 20 hours:
a) Make a snapshot of the EBS volume that holds the CSV files.
b) Start one m1.large EC2 instance that reads the page.csv in order to post the topic IDs to an Amazon SQS (Simple Queue Service) queue.
c) Start six m2.4xlarge worker EC2 instances that perform the Connects calculation in parallel; each of the EC2 instances fetches topic IDs from the SQS queue, performs the Connects calculation and stores the result in separate CSV files.
d) In parallel, start one m1.medium worker EC2 instance that calculates topic labels for each topic, storing the result in CSV files, too; topic labels are WIKIPEDIA redirect names or the text of links that point to a topic.
e) Each of these eight EC2 instances is provided with the snapshot data via EBS volumes created from the snapshot that holds the CSV files.

A third step prepares the CSV files generated in step 2 to be loaded into a temporary MySQL (My Structured Query Language) database, requiring about 7 hours:
a) Copy the step-2 CSV files from the 7 worker EC2 instances to the m1.large EC2 instance.
b) Concatenate the CSV files, sort them by ID and split them again into chunks of 1 GB. The reason for this step is related to technical details of MySQL's InnoDB database engine; due to its clustered index structure, InnoDB can load sorted CSV files much faster than it can unsorted ones. Moreover, the files should not be larger than 1 GB for performance reasons.
c) The resulting CSV files are loaded into MySQL A fourth step is the creation of an Apache Solr index over the temporary MySQL database, which requires about an hour and, a fifth or last step includes swapping the temporary MySQL database and Solr indexes into production, which is an atomic operation that guarantees data consistency and assures that the MySQL database and the Solr index are in sync; this step takes just one second, after which the data are available for the intended operation.

Please note, however, that while the invention is described with use of the WIKIPEDIA content data (i.e. WIKIPEDIA-defined topics and connections), the description is presented for exemplary purposes only and is not intended to limit the scope and spirit of the invention. Any appropriately available and prepared content data can be processed according to the inventive principles to realize the curated topic data records and the interrelatedness data therebetween.

The invention also embodies a software framework that enables copying and making appropriate modifications to a software template, in order to operate with the specific stored themed subjects (with which the system/method is preconfigured), and with data defining topic-to-topic, editorially curated relatedness (the joining descriptions included within the themed subjects), to realize specific theme-based implementations of the inventive database system and method. The contents of the joining descriptions (which in one sense are connections) are contextual and bear a particular relatedness to the systemic theme. By their relatedness to the theme, the contents of the joining descriptions also relate in varying degrees to the curated topic data records. The software framework, therefore, is reusable in developing applications, products and solutions described in detail herein.

FIG. 1 depicts an environment in which the user-searchable database system of the invention operates. Therein, the inventive database system embodies one or more computer systems, which operate(s) as a web server 10. Web server 10 is programmed (and/or otherwise configured) to carry out and enable inventive operation. As used herein, server refers to hardware and/or software, as long as each are interpreted as storing the curated content and operating to enable users (user browsers) connected thereto to access the curated topic data content through the user interface.

Server 10 also is connected to the Internet 20 and to a secondary data storage device (memory) 2542. A secondary memory storage device (memory) 2544, a desktop computer (Desktop) 30, a laptop computer (Laptop) 35, a Smartphone 40, a Tablet/electronic hand-held device 45, an Internet-connected television (Internet-connected TV) 25, also are connected to the server 10 via the Internet 20. And while the invention is described with reference to server 10, the system may be implemented using any computer-based electronic device or data processor (for example, a distributed network of computer systems, programmed and configured accordingly), without deviating from the inventive principles.

Digital content providers (block 50) are the source of the topical content (e.g., WIKIPEDIA). Block 55 represents providers of linked (as distinguished from stored) content, in any form such as image data, moving image data, audio data, multimedia data, textual data, etc., without limitation (Linked digital content providers). Links to same are provided when pages provided through the user interface are rendered at run time. Block 60 (Physical or digital product providers) represents various sources of physical and/or digital products or product data, which are accessed by the server 10 via the Internet 20. For that matter, product data and/or links to product data may be found in one or more product databases 65, connectable to the server 10 via the Internet 20. Please note that the server or database system also operates with local databases (see FIG. 2) and that while FIG. 1 depicts the server 10 connected directly to the Internet, the inventive operation is not limited thereto. The server 10 may be connected to the Internet 20 by other means, for example, wirelessly or via a satellite or cellular link without deviating from the scope and spirit of the invention.

The inventive system and method comprise or operate a number of main functional or operational sections: Connects, Shops, ThemedSubjects, UI (user interface) and Communications. These functional sections are identified in FIG. 2 as the Connects function 210, the Shops function 220, the ThemedSubjects function 230, the user interface function (UI) 240 and the Communication function 250. The functions cooperate to implement the inventive system, as will now be described in greater detail.

Connects

The Connects function 210 defines the content-sourced relationships (i.e., the connections) between a curated topic and all of the other curated stored topics, according to rules. The connections are based on reading and ranking the known degree of relatedness among topics rather than any evaluation of any attribute of the topics themselves. The connections are defined by a relatedness engine, which in a preferred embodiment is the WIKIPEDIAMINER engine. The data are first imported or downloaded using a process configured to expediently move very large amounts of data and, temporarily store the pre-processed content data to optimize processing. Determining the most significant relationships between any arbitrary topic (from WIKIPEDIA, for example), and all other WIKIPEDIA topics contained in the imported content data is a significant processing task. The task is supported in part by application of the WIKIPEDIAMINER tools and may employ several web services, such as EC2, MapReduce, RDS, and SCIS, to form a cloud-based grid to run this complex process to generate the data required for system operation.

The Connects function 210 is agnostic to topic type (for example, a person, a musician, an American, etc.) and is concerned only with the scores given to the relationships between a (main) topic and its corresponding set of connected topics. The relatedness (or score) between any given main topic and its connected topics is, in part, derived from how often a connected topic is mentioned within a main topic's data, how often a topic is mentioned within connected topics' data and, how often both topics (main and connected topics) are mentioned in the data of other topics (all together, the "link frequency" algorithm). (Note that any "main" topic can also be a "connected" topic and vice versa.) The relatedness scores or rankings are generated for the topics ahead of time using WIKIPEDIAMINER tools (in a system preconfiguration stage) and then called up at run time to form pages during the system's operation. Relationships so scored by the Connects function change dynamically based on the periodic updates and/or revisions of the sourced content data in the system.

The Connects function 210 operates a Connects database (C DB) 212; the Shops function 220 operates a Shops database (S DB) 222; and the ThemedSubjects function 230 operates a ThemedSubjects database (T DB) 232. The UI function 240 operates the user interface and the Communication function 250 provides for communication (e.g., data, messaging) between the system and outside sources for content or data, for example, video content or updated product data or metadata. The Connects function 210 includes scripts that dynamically (at run time) pull relevant content from such outside sources (FIG. 1, block 50) and from Linked digital content providers (FIG. 1, block 55). The Connects function also provides to the Shops function topic and connection data that is utilized when a Shops is created for one of the Connects topics.

In the embodiment shown, the Connects function 210 also operates a topic search function (with proper protocol) on the Solr platform, matching a user's search term/string with the generated index of Connects topics for the stored, curated topic data. That is, in response to a user's search input, the topics search function passes the search term to Solr as three different subterms (for example, as-is, as-is with a wildcard appended and as a phrase search on "labels" only). The three search terms are joined with a logical OR operator. A case-insensitive substring match is executed against topic fields, where numbers in parentheses indicate the simple and the phrase boost factors, for example: topic title (1, 10), right-left anchored topic title (4, 400), right-anchored topic title (30, 30), left-anchored topic title (20, 20), and label (40). As a secondary ranking, among topics with the same Solr score, topics with more connections are assigned a higher score linearly to the number of connections.

Shops

The Shops function 220 generates and populates a Shops database 222 with the product records (comprising product data and/or links to product data). Connects topics and themed subjects operate with Shops. A Shop is a list of products which are related to the user's topic. The products listed in the Shop may be derived from the Ingram Book database, or any other sources of product data (see block 60 in FIG. 1). The invention includes and operates a highly specialized, custom search engine (Shops function 220) to deliver, at run time, the user-requested Shop.

The Shops function 220 further operates links from any particular Connects page (for example, a page in which a topic, a list of connected topics, a list of related theme subjects, etc., are displayed) to corresponding Shops, by which link the user navigates to a Shop. In addition to its main topic (i.e. its corresponding Connects topic title), the Shop_search uses at run time, as part of its input (as a filter), the titles of the topic's connections, derived from content providers (e.g., WIKIPEDIA), processed by the Connects function 210 and stored in Connects database (C DB 212). Queries are processed, passed to a manager (in the preferred embodiment, a Solr manager), which is controlled according to the inventive principles. Given a Connects topic title, product rules define the products displayed in the Shop's product list, i.e., the Shop. These product rules relate to a Solr result, modified by boost values, that is invoked for any given topic.

The Shops function 220 further operates in the themed subjects. Product images (screen elements) preferably are arranged four-per-row, with each row corresponding to joining descriptions between topics included in a themed subject (see graphical representation of a themed subject in FIG. 5). The themed subjects Shops page displays the four products associated with each and every one of the editorially curated relationships in the themed subject.

A Shop products page is a page presented by the interface including details provided from the metadata of all the products (each identified by a unique "EAN"), grouped as a single work. In effect, Shop product pages group all the products from the same copyright as a single work.

ThemedSubjects

While the Connects function 210 Connects topics to the user's main topic of inquiry, themed subjects do not have a single main topic. For that matter, a Connects topic may have 100 or more connections (i.e. connected topics). Themed subjects are preferably limited to around 10 topics and, to a similar number of editorially curated relationships (i.e. connections) between topics.

The ThemedSubjects function 230 manages themed editorial works comprising the joining descriptions, which describe editorially curated relationships therebetween. Portions of the joining descriptions (text, for example) are presented in window-like areas (screen elements), preferably with buttons or labels linking to other data, for example, to a Shop. Themed subjects may be described as a collection of contextual (topic) data records that relate to one another and to the theme of the themed subject (The Harlem Renaissance, for example). Together with the user interface 240, the ThemedSubjects function 230 enables exploration of a themed subject, with a special focus on the editorially curated relationships, which comprise the graphical representation.

In greater detail, relationships or relatedness between topics comprising any of the themed subjects are displayed in the graphical representation. Window-like elements represent the topics within the themed subject, and the positioning of the window-like elements communicates relatedness between the topics that make up the themed subject. Small, numbered circles overlapping the edges of two connected topics, essentially joining the topics, provide links to the corresponding editorially curated joining descriptions. Clicking on one of the numbered circles connecting two topics in the graphical representation navigates to a page in which the joining description for same is presented.

For each themed subject editorially curated relationship, the ThemedSubjects function 230 runs the title of the two "connected" topics through the Shops function 220. This is done serially and takes the top two product results for each query. Four products for each editorially curated relationship are realized.

Preferably, a themed subject includes a graphical representation page, a "connection" page(s), a Media page, a Reader View page and a Shop page. The "connection" page displays a joining description (copy pertaining to the editorially curated relationship between the two topics) and the following buttons: previous "connection," next "connection," Shop, Media, and Back to Map.

Reader pages are like the themed subject graphical representation pages, except that instead of the graphical representation (or "CultureMap™", the reader page delivers all of the editorially created textual copy relating topics to each other as depicted in the graphical representation of the themed subject. For example, the themed subject's title and "About this Map" copy is shown in the left column, and in the main content area, title and joining description for each editorially curated relationship is displayed in a single, printable document.

To search the ThemedSubjects database (232), the search term is passed to Solr. A case-insensitive substring match is executed against the following themed subject fields: title, subtitle, themed subject description, topic title, related Connects topic title, joining description text, and author name.

User Interface

The user interface function 240 provides a user interface that is intuitive, attractive and configured to operate on a wide array of web browsers and modern mobile devices using the HTML Canvas element. The result is a highly functional and cross-platform user interface to the stored topical data, product data and themed subject data, i.e., providing access to the database system and method.

Communications

The Communication function 250 provides for communications between the system and method (application program) and the user electronic devices, content providers, products providers and databases, etc. (see FIG. 1).

Operation of the invention, including particular operation of the user interface will now be described with reference to FIGS. 3-20. After processing, storing and indexing the imported content, including the connections or relationships between topics (a score or ranking generated by the invention's process), the method includes operating a website (a server) to which users connect (using their browsers) to access the curated content via the pages generated at run time and presented through the user interface.

Figure 3:
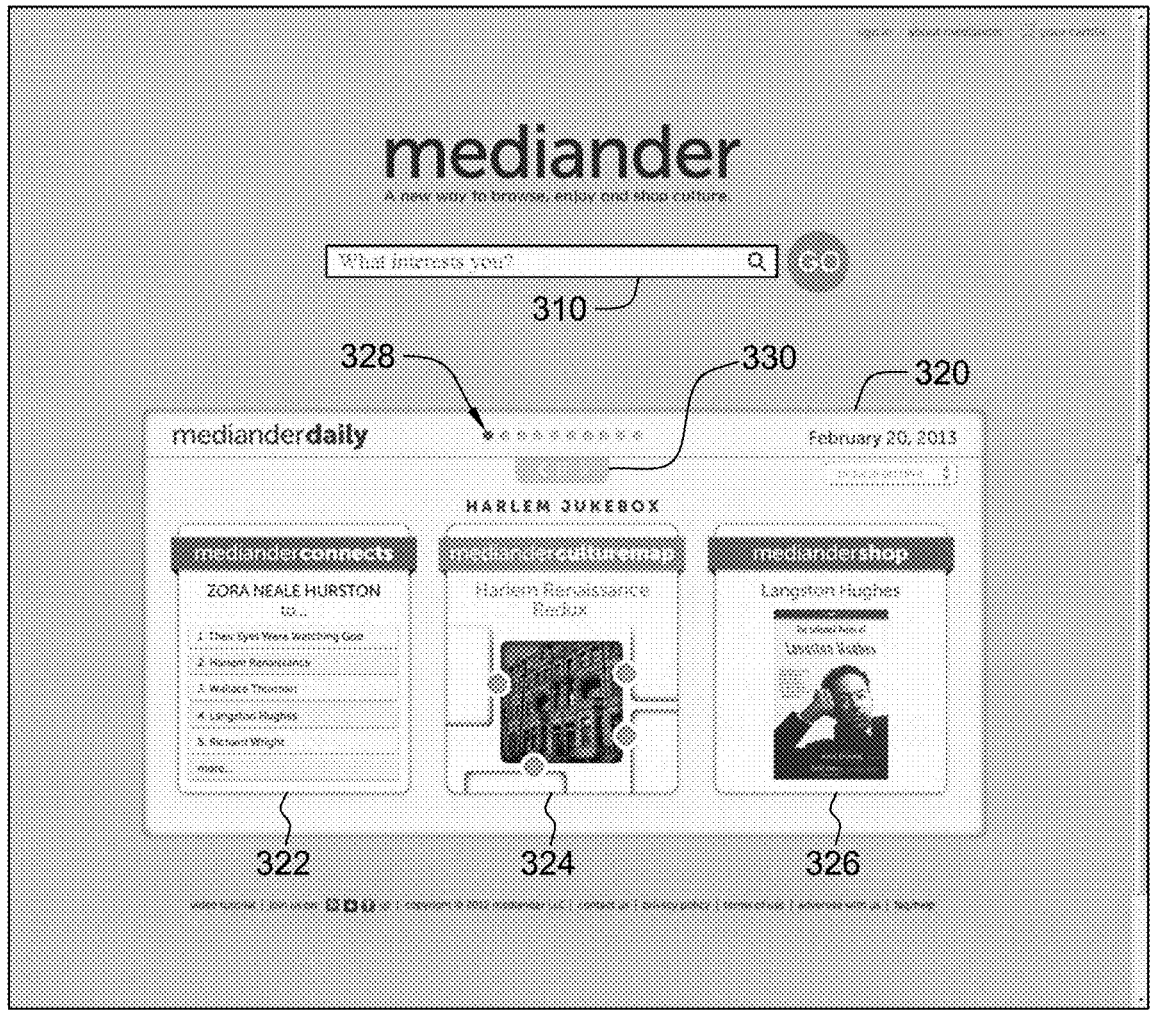

FIG. 3 depicts an exemplary embodiment of a "home page" provided by the invention, with two primary screen elements. The first screen element 310 is a search box and, the second FIG. 3 screen element (below the search box element) is a "daily feature" element 320. The daily feature element selectively presents data content derived from curated stored data and linked data (not stored) otherwise accessible to the system and/or running software application.

A window-like area or screen element 322 ("mediander Connects™") presents one Connects topic (e.g.; Zora Neale Hurston) and a list of five other Connects topics that are connected to the first topic. The entire screen element 322 is a button that, when pressed, takes the user to the Connects topic page (depicted in FIG. 4) named at the top of the screen element.

Figure 5:
FIG. 5 depicts a themed subject page.

Another window-like area 324 (in FIG. 3) comprises elements representative of themed subjects (identified in FIG. 3 as "medianderculturemap"). As introduced above, FIG. 5 depicts an exemplary themed subject (e.g. Harlem Renaissance Redux), as a graphical representation of topics and the relationships between the topics, in accordance with the themed subject.

Another window-like area 326 (in FIG. 3) comprises a ("mediandershop") element representative of an individual Shop. For example, activation of an element 326 causes the system to open a Shop page, such as the Shop page depicted in FIG. 9. Screen element 326 may also be configured to link directly to an individual Shop product page, such as the one depicted in FIG. 6.

Each of the three window-like areas (screen elements) in FIG. 3 operates as buttons to navigate to the element (and another screen) named within the button and, are organized together under a common "theme." In this case, the theme is "Harlem Jukebox." In one embodiment, a number of triples or themes (up to eight) are presented each day. By default, the eight triples auto-rotate, as in a slideshow or carousel. The eight triples may be manually browsed using screen select elements 328 and 330.

Figure 6:
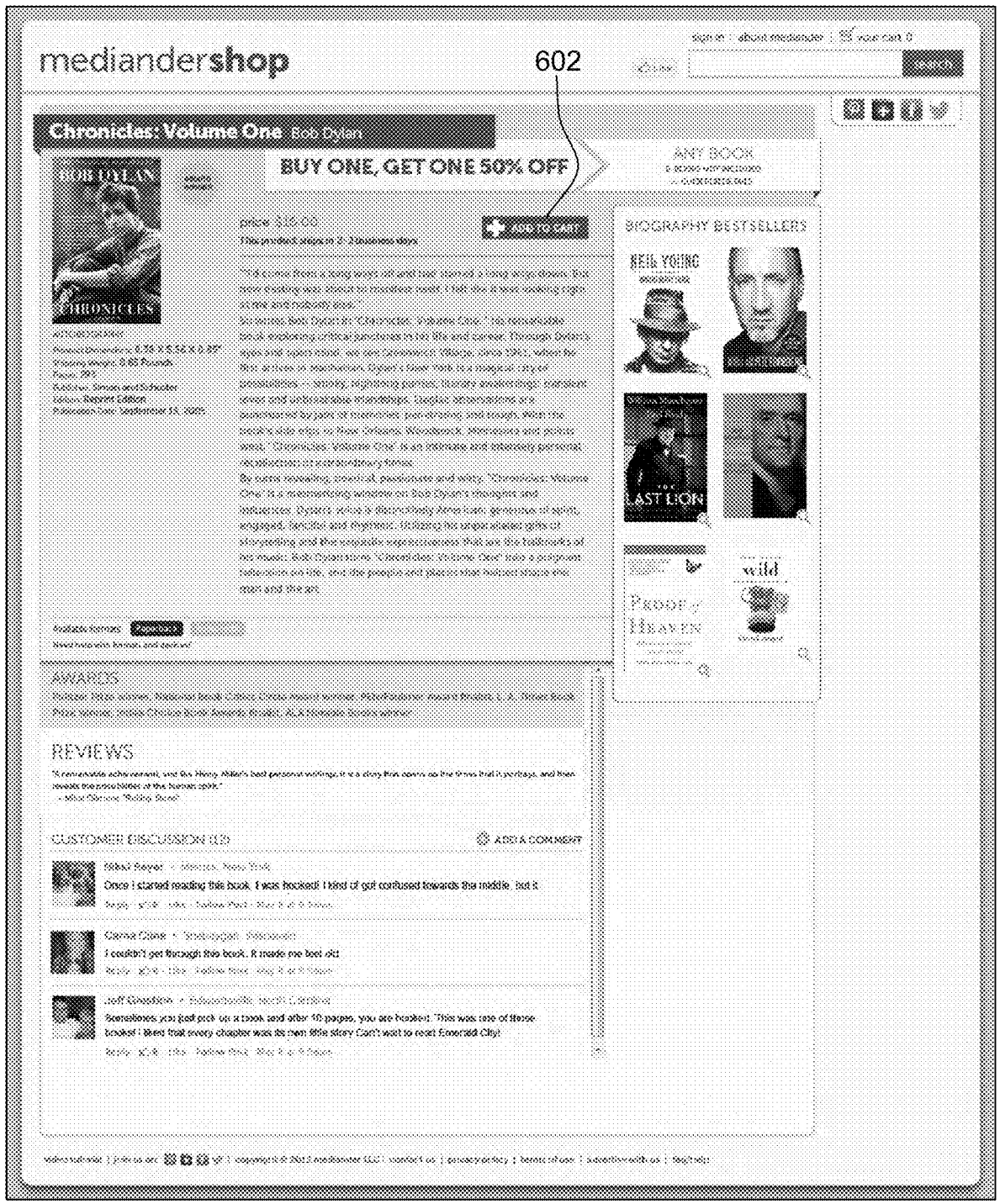
FIG. 6 depicts a Shop product page.

The FIG. 6 Shop product presents information and reviews on a product (for example, "Chronicles: Volume One") and a list of other products the consumer may find of interest. The product information is included in database 222 and, initially, derives from Ingram, in the preferred embodiment. The user is enabled to click on different formats to change the information displayed. Clicking on a related product thumbnail (element) opens a product quickview lightbox (or page), such as that depicted in FIG. 11 ("Bob Dylan Revisited").

Figure 7:
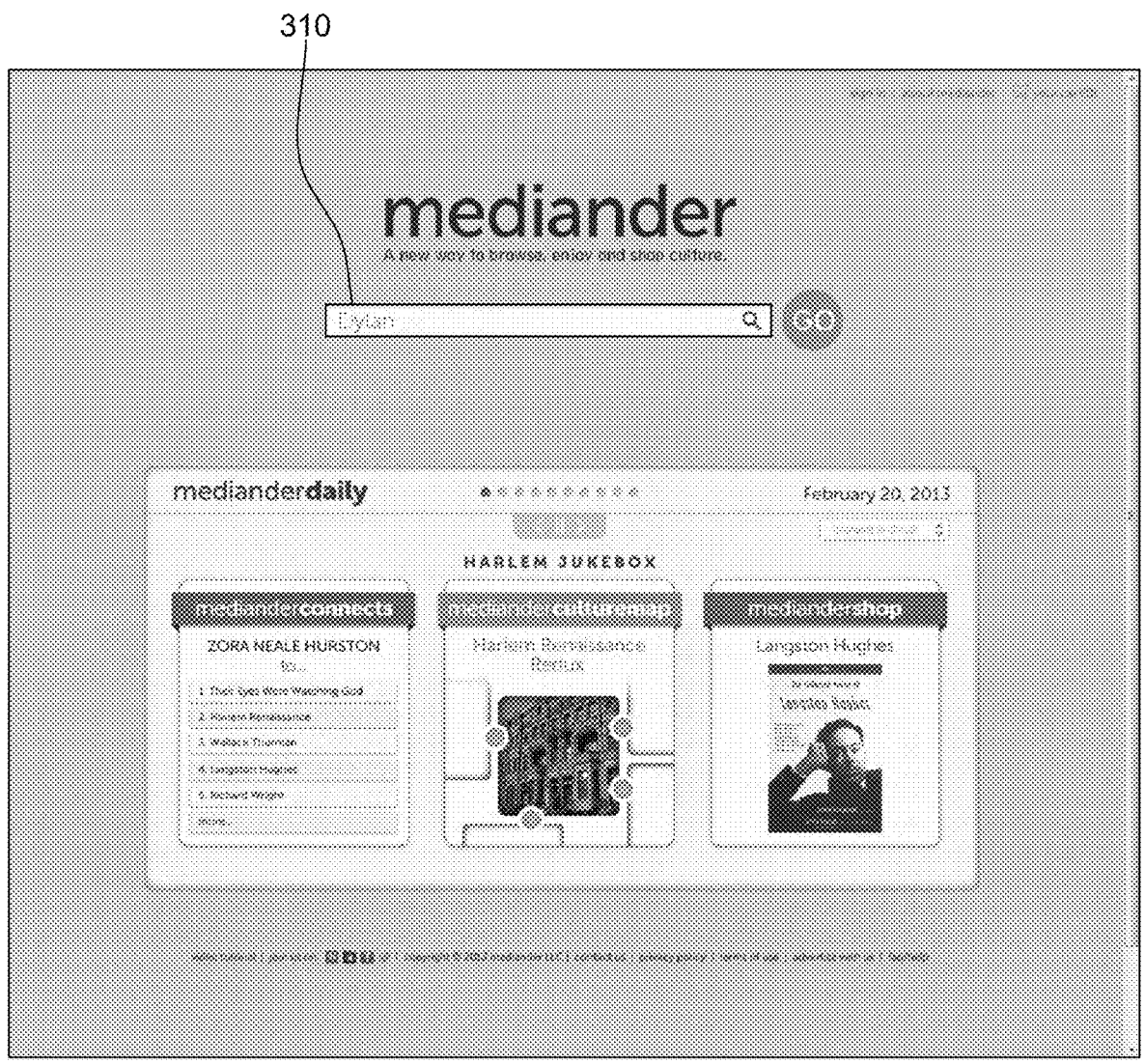
FIG. 7 depicts the FIG. 3 home page with a search query input ("Dylan")
Figure 8:
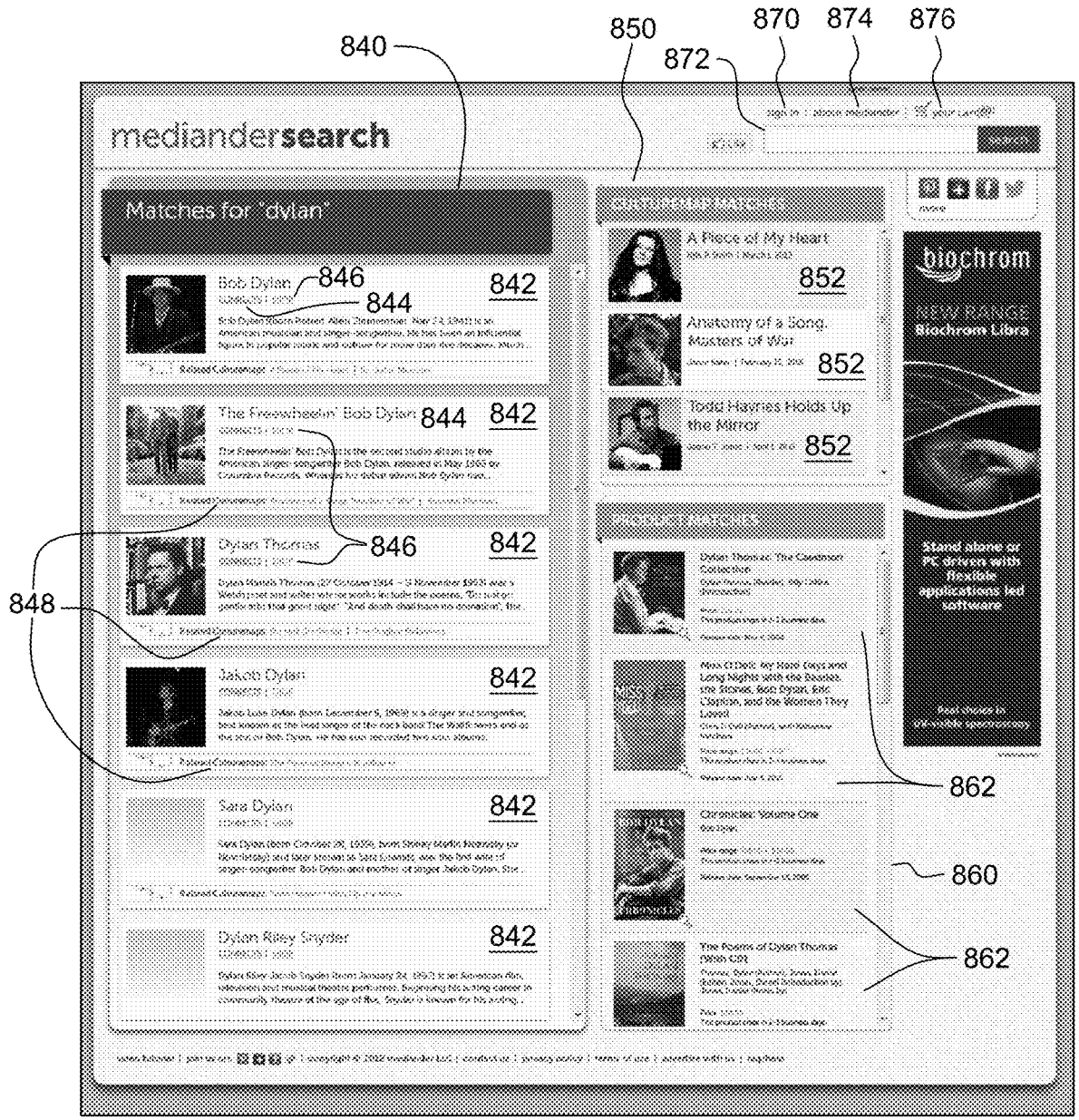
FIG. 8 depicts a search results page for search query input "dylan"

FIG. 7 depicts the FIG. 3 home page with "Dylan" (input by a user) in the search box element 310. After using an input device to activate the "GO" button or pressing return, the system navigates to a search results page. FIG. 8 provides an exemplary embodiment of a search results page (e.g., mediandersearch).

The exemplary search results page (FIG. 8) has three main sections or screen regions that display results based on the user's search term. For example, the "dylan" search resulted in topic matches depicted in a screen area 840, themed subject matches depicted in a screen area 850 and product matches depicted in a screen area 860. Elements 840, 850 and 860 are preferably scroll elements. Within each "match" displayed, the user is invited to choose which match topic, match product or match themed subject in which he or she is interested, and to click on any of the elements.

The topic matches are shown arranged (in window-like screen area 840) in lists of topic elements 842. The topic elements of the search results page (FIG. 8) each comprise at least part of the topic content data (and links to related data). The Connects search function "matches" the user's search query or string to topics within the Connects database 212. As explained, the Connects search function parses the user's literal words or phrases (search string), looks for matches within the official titles and known alias titles of the topics where the results ("matches") are ranked according to several criteria, including connections between the topics.

Figure 4:
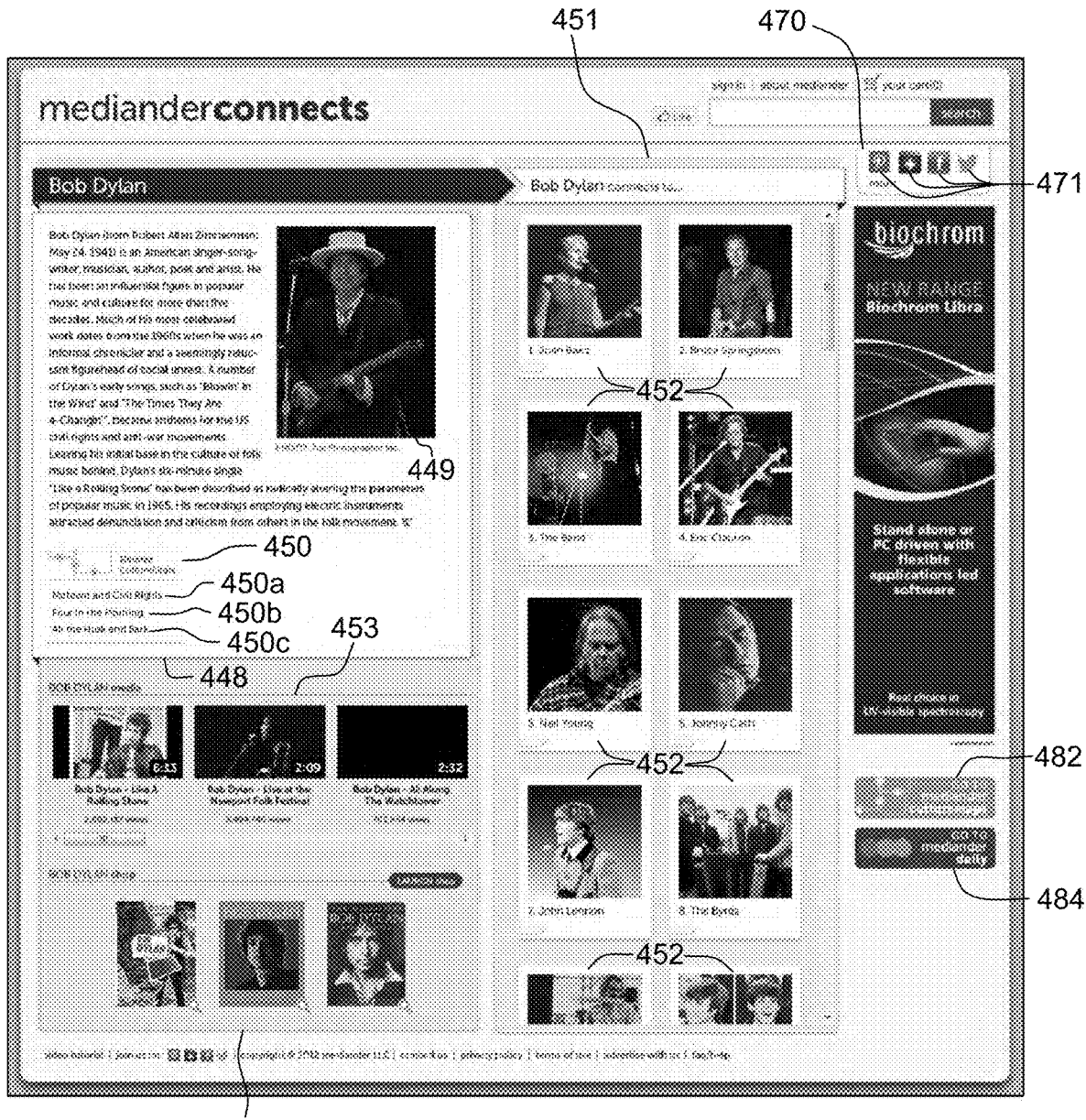
FIG. 4 depicts a Connects topic page.
Figure 9:
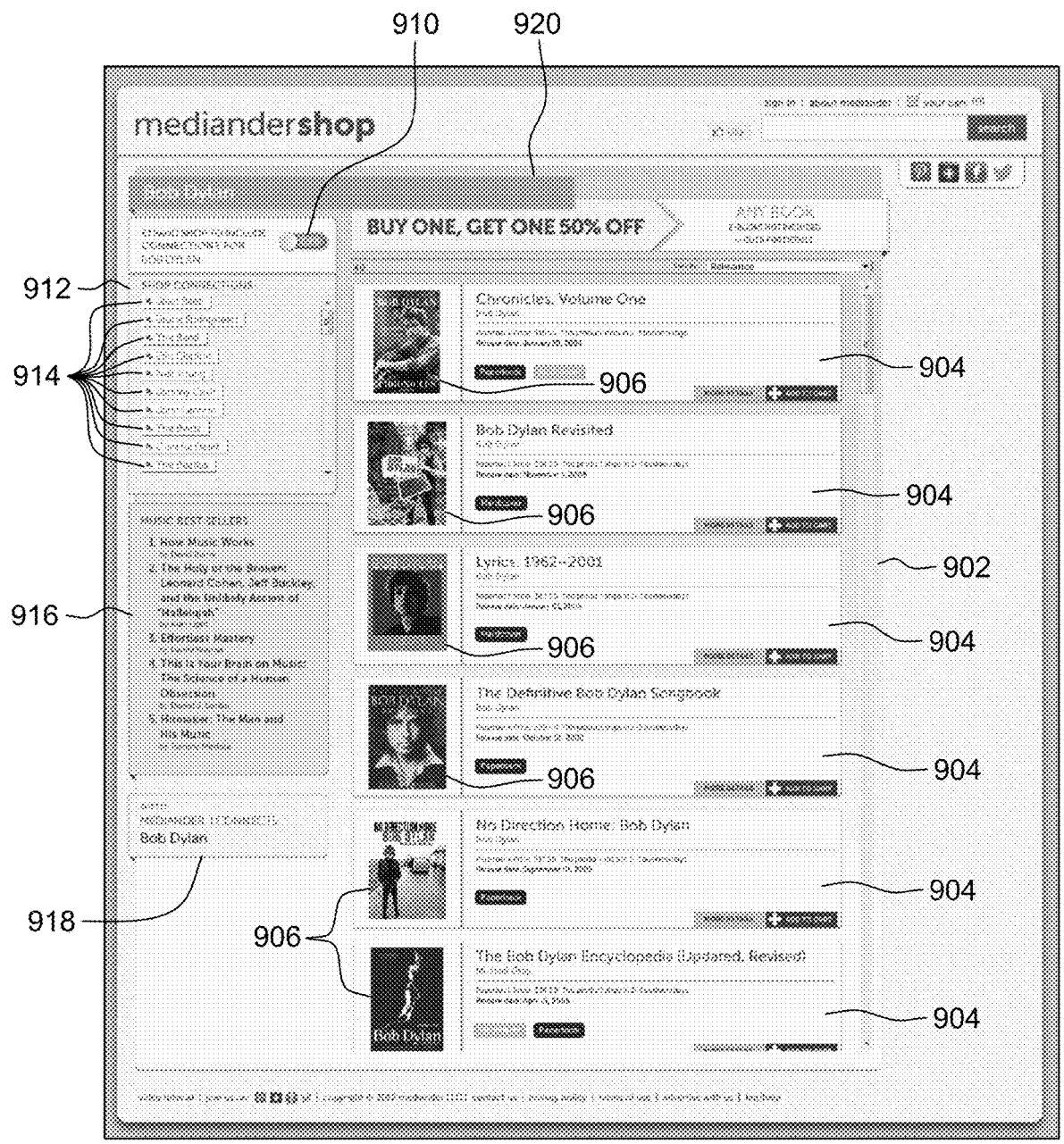
FIG. 9 depicts a Shop page (list of products)

Each topic element 842 (of the topic matches) is shown to preferably include a topic image, a topic title, text about the topic, a link to a Connects 844 (CONNECTS button or element) on the topic, a link (SHOP button or element) 846 to a Shop for the topic, and a link to themed subjects (e.g. Rockstar Memories; A Piece of My Heart) 848, related to the topic (e.g. "Bob Dylan"). Clicking on a "Connects" link 844, navigates to the Connects main page (as shown in FIG. 4), clicking on a "Shop" link 846, navigates to a Shop default view (as shown in FIG. 9) and clicking on a themed subject title 848 navigates to the themed subject graphical representation (as shown in FIG. 5).

The themed subject matches 852 (presented in window-like area 852) are ranked according to relevance and are positioned in area 852 according to such relevance ranking. For example, a user search term match within a themed subject title ranks higher than a match within the text of a joining description within a themed subject. Clicking one of the listed themed subject matches 852 causes the system to navigate to the graphical representation of the themed subject as shown in the FIG. 5 embodiment.

The product matches 862 (presented in window-like area 860) are ranked according to relevance. For example, a match within a product title ranks higher than a match within a product description text. Clicking one of the "product match" elements 862 causes the system to navigate to a Shop product page (such as FIG. 6).

The general functionality of the global navigation links and functionalities account (sign in) 870, system description ("about mediander") 874, shopping cart (your cart 876, etc), which are positioned above a search box 872, and social media buttons, are available at the top and bottom of the screen (that is, the display area comprising the user's display device), by the user interface. FIG. 4, for example, presents a window-like area 470 with active screen elements 471 to enable forwarding to various social media websites (e.g., PINTEREST, GOOGLE+, FACEBOOK, TWITTER).

The FIG. 4 Connects main page ("medianderconnects") provides the user with information, media and products on the user's chosen (main) topic (screen element 448), as well as a list of up to 50 topics related to the user's main topic, in window-like screen element 451. Starting at the top and, extending down the page (display screen area) along the left side, the Connects page presents elements 448 with a text description of the main topic (from curated stored content), a link to the main topic's page on WIKIPEDIA (clicking on "W" opens a separate window), an image 449 of the main topic (live stream from WIKIPEDIA, i.e. not stored content), a list of themed subjects 450 (linking elements) related to the main topic (results are generated by a more restrictive version of the algorithm of the ThemedSubjects function 230 on the Search Results page), videos in a display area 453, which are related to the main topic (e.g., from the YouTube API), and a display area 454 presenting a link to a Shop (FIG. 8) for the main topic and product screen elements with links to Shop product pages (FIG. 6).

Figure 10:
FIG. 10 depicts a Connects video lightbox or page.
Figure 11:
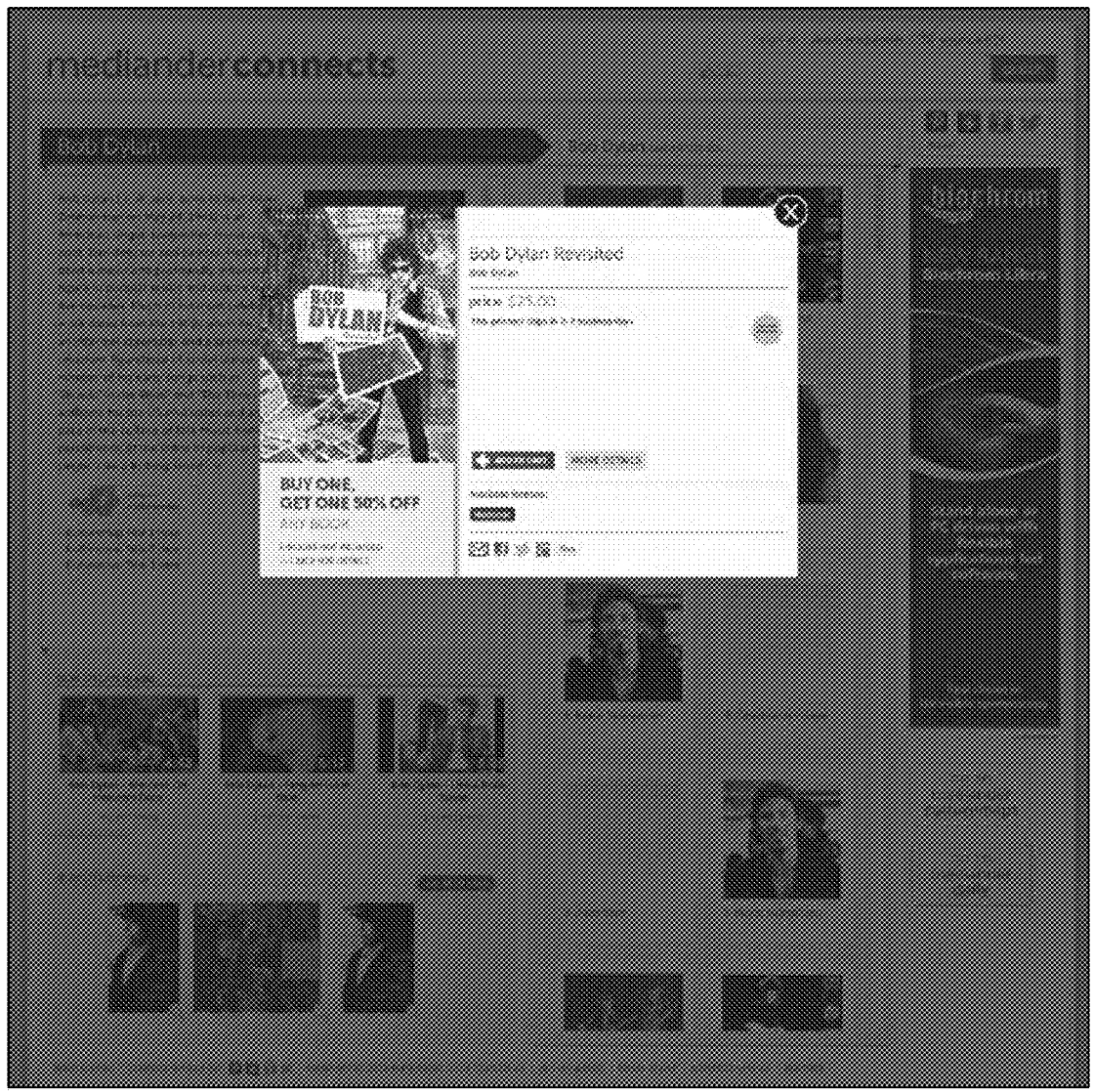
FIG. 11 depicts a product quickview lightbox or page.

Clicking on one of the links (elements 450*a*, 450*b*, 450*c*) presented in the Related ("CultureMap") theme subjects element 450, causes that themed subject's graphical representation to be presented (such as FIG. 5). Clicking on one of (e.g., twelve) videos (active icon elements) 453 causes a video lightbox to open. (FIG. 10 presents an exemplary embodiment of such video lightbox or page, which allows the user to play, and navigate through, the videos related to the main topic.) Clicking one of the product thumbnails 454 will open a product quickview lightbox or page. FIG. 11 presents an exemplary embodiment of such video lightbox or page. The product quickview lightbox (FIG. 11) displays product information and an image, and also provides a link to the product's details page (Shop product page; FIG. 6) and provides the functionality to add the product to the user's shopping cart (detail on FIG. 13). If other formats are available, the lightbox provides buttons to change the product information to match each format.

Each connected topic element 452 has two links. The first link is to the connection lightbox or page depicted in FIG. 14, which is accessed by clicking on the image or the name of the topic. The second link, accessed by clicking the "make anchor" tab, is to a new Connects topic page with the connected topic now being the main topic (as in FIG. 4). The user can hover over the connected topic button 452 to see a short text description of the topic. The text is extracted from the topical data records stored in the Connects database 212. Global navigation links and functionalities (account, search box, shopping cart, etc.) and social media buttons (elements 471, etc.) are available at the top and bottom of the page (screen) and provide customary functionality.

The Connects topic page also provides additional links 482 and 484 to the themed subjects landing page (FIG. 12) and to the home page (FIG. 3), respectively.

FIG. 5 depicts the topics (of a themed subject) in window-like areas in a graphical representation of relatedness between topics. The themed subject default view page, depicted as a "culturemap" in FIG. 5, offers a graphical presentation of the content of the themed subject, a descriptive "about this map" text 502, map author, and links to the themed subject Shop presented in FIG. 16, links to a themed subject reader view or page presented in FIG. 17, wherein texts 1901' associated with graphical representation of a connection between two topics 510 are presented and accessed using scroll button 1702. With the exception of the list of "related themed subjects" (501 in FIG. 5) and the list of related products in the themed subject Shop (FIG. 16), all of the content on the themed subjects is editorially generated; none of it is automatic or algorithmic. On the graphical representation, topics 502' are represented by the squares or tiles, and descriptions (i.e., joining descriptions 1901 in FIG. 19) between topics 502' are represented by the numbered circles 510, which join two topics. The general functionality of the global navigation links and functionalities (account, search box, shopping cart, etc.) and of social media buttons is available at the top and bottom of the page. And as described above, additional links are available to the themed subjects ("culturemap") landing page depicted in FIG. 12 and to the home page, depicted in FIGS. 3 and 7.

Figure 2:
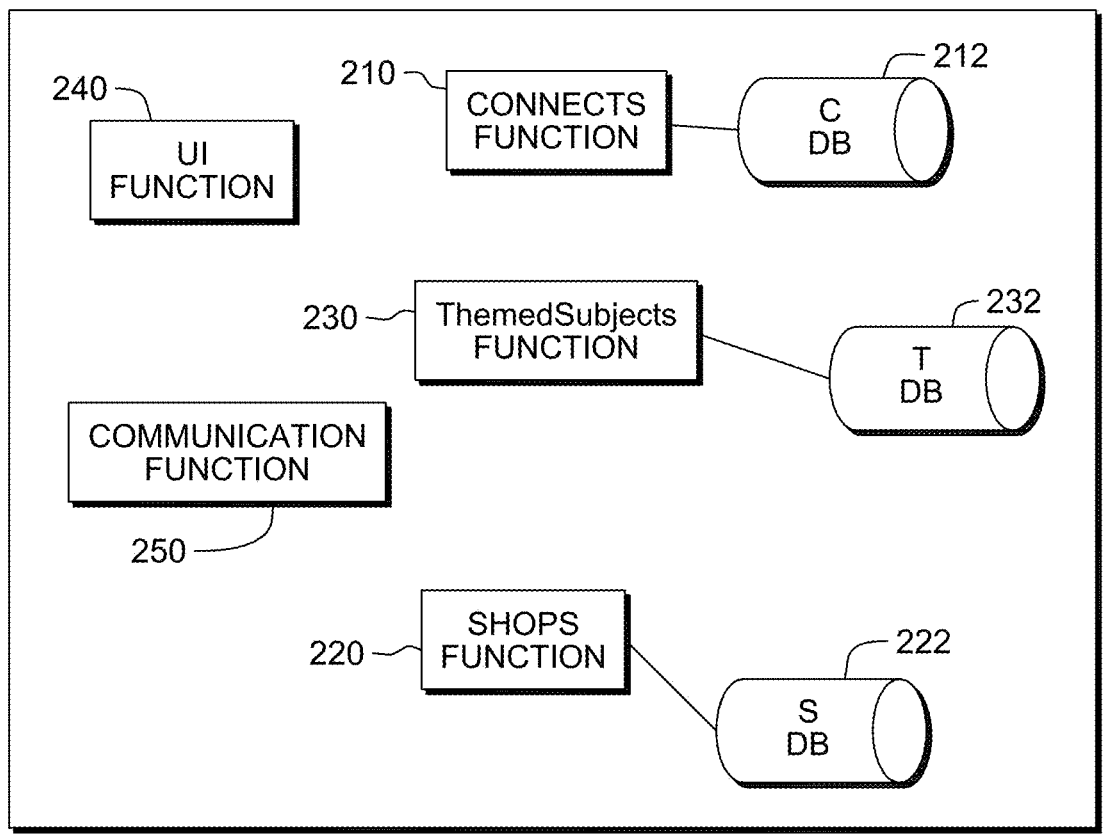

As described, a Shop page (list of products), such as that depicted in FIG. 9 ("mediandershop"), is constructed at run time by the Shop function 220 with information garnered or generated by the Connects function 210 and a full-featured Shops database 222 (FIG. 2). The Shop search is complex and utilizes relatively straight-forward keyword matches (on the main topic) alongside matches for the topics that are connected to the main topic (and other processing techniques). The Shop search engine applies specialized knowledge about a topic and the topic's set of connected topics, to finding and presenting to the user the best and most relevant products about a topic.

Just as in the Connects main page (FIG. 4), the Shop default view (FIG. 9) is fundamentally about a single topic (the main topic, Bob Dylan, for example). Shops offer products (thumbnails or elements) 904 by or about the main topic, and, once expanded, products by or about the main topic's connected topics (see FIG. 15 for the expanded Shop view). In this way, like Connects, Shops are about both topics and the connections between topics, joining such topics as contextually relevant to a user's chosen topic.

In FIG. 9, each product element 904 includes a product image 906, title, author, price and other product data—all stored (and from Ingram). The interface enables the user to navigate to a Shop product page (FIG. 6). There, the user may add the selected product to his or her cart using a link 602, and he or she can click buttons to see information on different formats (when applicable). This list of products 902 in the Shop (FIG. 9) can be sorted by relevance or price and alphabetically.

Along the left of the Shop page (FIG. 9), a button or element 910 is included to "expand the Shop to include connections for . . . ". Clicking on button 910 causes a change in the presentation of the product elements in window-like area 902 (see FIG. 15), wherein one product for each of the connected topics is added to the current Shop page. Below the "expand" button 910 is a list 912 of up to 50 topic elements 914, topics of which are connected to the main topic (see Connects main topic page in FIG. 4). Clicking on one of the connected topics will reassemble the Shop with the connected topic now as the main topic. Below the expand button 912 is a screen element 916 that presents a special promotional list of products (e.g., music best sellers), that vary depending on the main topic's predetermined category (entertainment-music, society and culture—philosophy, etc.)

The lower left of the Shop page presents a link 918 to the Connects main page for the topic of the present Shop (for example, as depicted in FIG. 4), where the name 920 of the main topic at the top of the page also links here. The general functionality of the global navigation links and functionalities (account, search box, shopping cart, etc.) and of social media buttons is available at the top and bottom of the screen.

Figure 12:
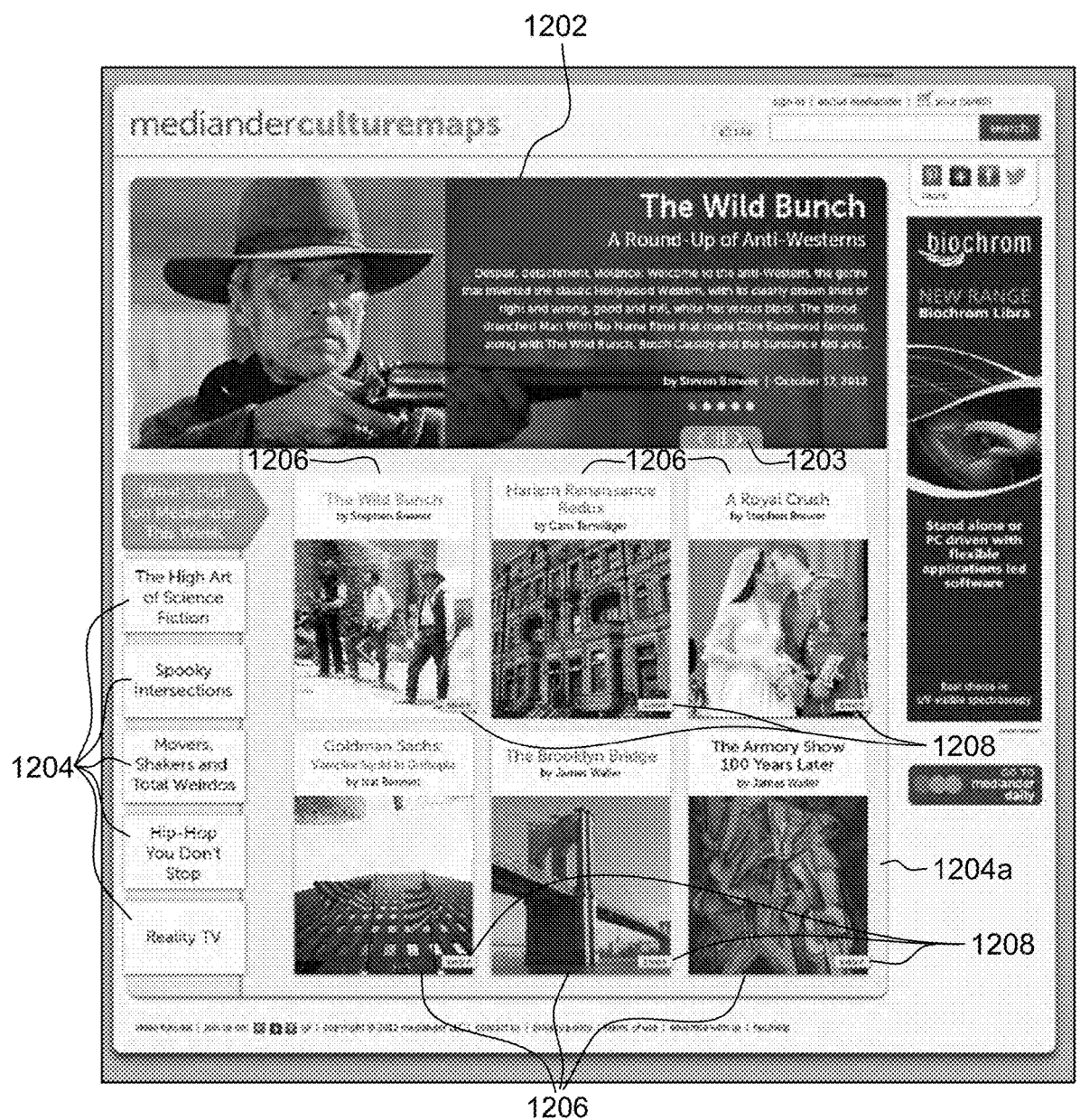
FIG. 12 depicts the themed subjects landing page, featuring themed subjects of the day and past days in screen elements.
Figure 16:
FIG. 16 depicts a themed subject Shop.

FIG. 12 depicts the themed subject landing page, featuring five recently published themed subjects, in a top page section or screen element 1202. Clicking anywhere in screen element 1202 will take the user to the graphical representation of the featured themed subject. A button 1203 provides for switching between the different themed subjects of the day. Screen elements 1204 each correlate to one of a set or cluster 1204a. Each set or cluster 1204a comprises six themed subject elements 1206 as shown in FIG. 12. Clicking on a cluster name 1204 changes the cluster 1204a presented, and the set of six themed subjects displayed. Clicking on one of the themed subject's cluster buttons 1206 causes presentation of that themed subject's graphical representation page (such as depicted in FIG. 5). The user may also click on the small "Shop" button 1208 at the bottom right of each cluster button 1206 to go to that themed subject's Shop (FIG. 16).

Figure 13:
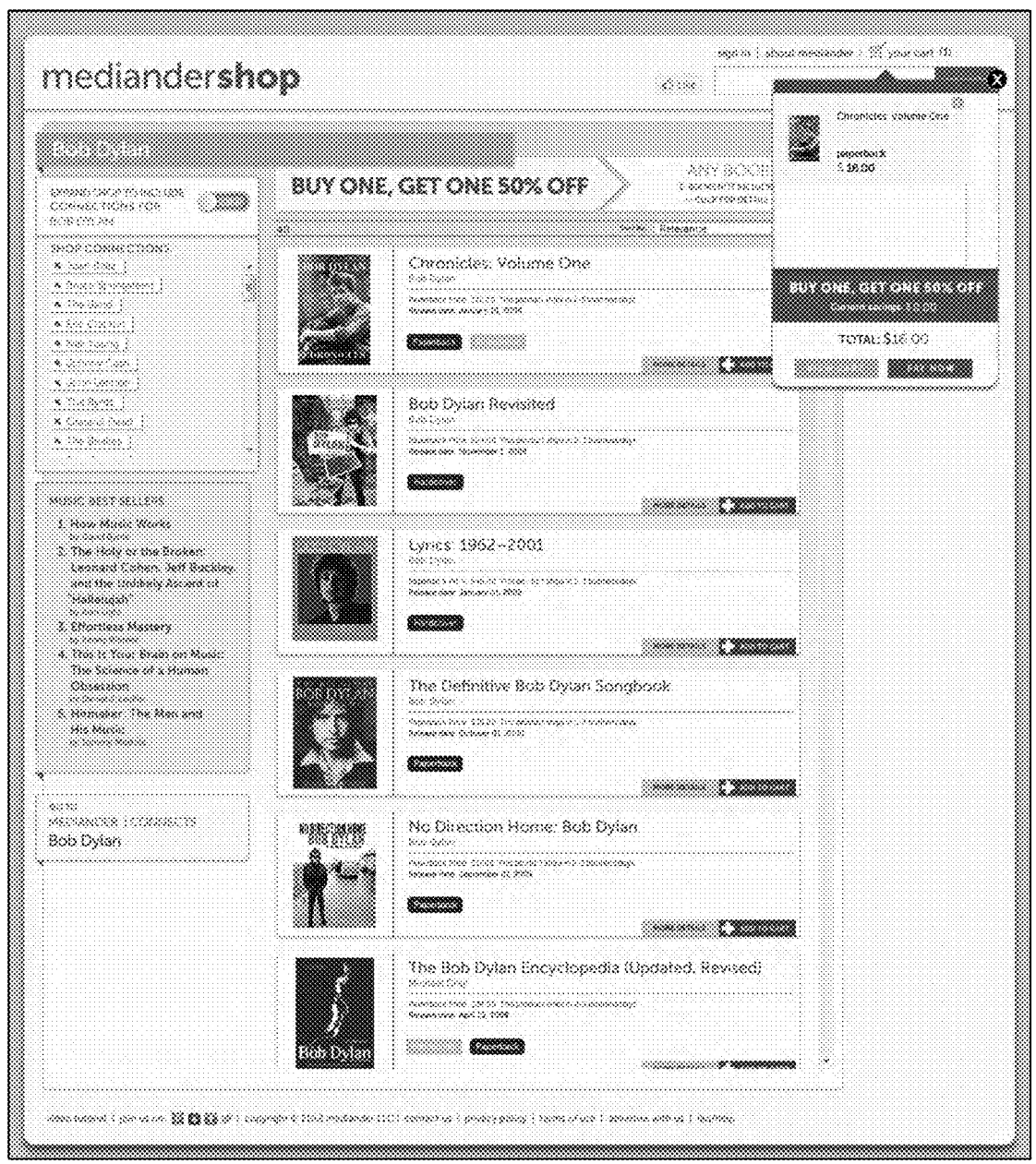
FIG. 13 depicts a Shop page (list of products) after a product is added to a shopping cart.

FIG. 13 depicts what the user sees when a product is added to the shopping cart.

From here, the user can delete a product from the cart, go to his full cart (an entire screen), begin checkout, or close the cart pop-up.

Figure 14:
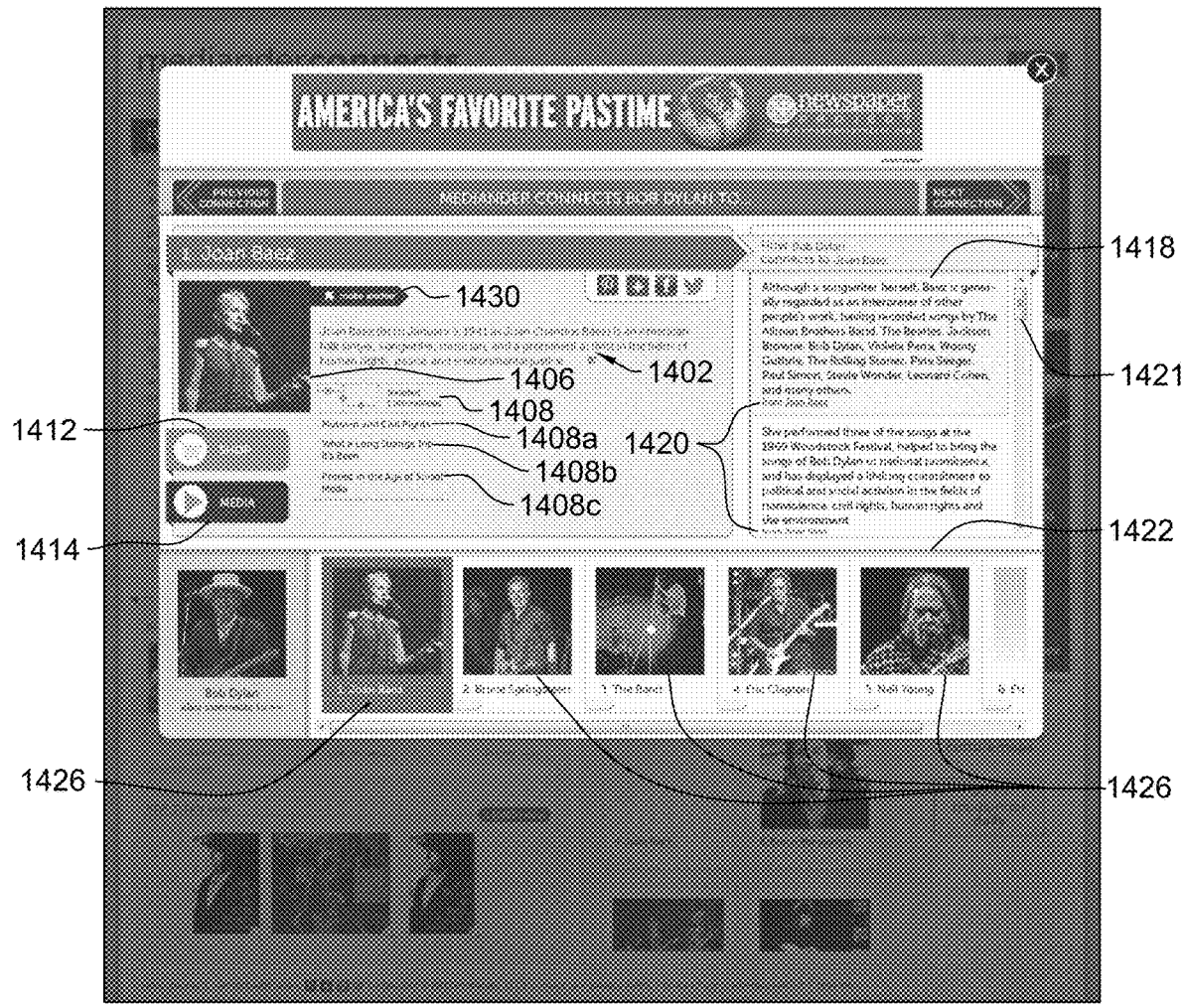
FIG. 14 depicts the Connects connection lightbox or page.

FIG. 14 is a Connects connection lightbox or page that presents information and links for the connected topic, text about the "connection" between the main topic and the connected topic and links to other topics connected to the main topic. In more detail, a textual description of the connected topic 1402 is presented in a topical element (the curated, stored content), a link to the connected topic's page on WIKIPEDIA (clicking on the small "W" opens in a separate window), an image of the connected topic 1406, a list of themed subjects (each a "CultureMap") 1408 (with links 1408a, 1408b, 1408c) related to the connected topic, related media 1414 (via YouTube API), and a link to the Shop 1412 for the connected topic (FIG. 9).

Clicking on one of the themed subjects links (1408a-c) causes presentation of that themed subject's graphical representation page, such as that depicted in FIG. 5. Clicking on the "Media" button 1414 opens a Connects video lightbox or page, such as that depicted in FIG. 10 as described above. In this case, the set of videos presented to the user (12, for example) is generated by a compound search (for example via YouTube's API) that utilizes both the main topic name (i.e. the topic named at the top left of FIG. 4) and the connected topic name. Clicking on the "Shop" button 1412 opens a Shop on the connected topic, such as that depicted in FIG. 9.

On the right side of the FIG. 14, underneath the banner reading: "How [main topic] connects to [connected topic]," various connection texts 1420 are displayed in screen element 1418, which are navigated using scroll button 1421. Each connection text that may appear is algorithmically generated and describes an aspect of the connection between the main topic and the connected topic. In the aggregate, they describe the relationship between the main topic and the connected topic.

Any textual descriptions, as used herein, are excerpted from the Connects 212 or ThemedSubjects 232 databases. For example, excerpts for use in connection texts 1418 may be generated during the processing stage by the Connects function 210. The excerpts are full sentences filtered from the data records to eliminate unwanted sentence fragments or other less desirable content. The excerpts may derive, for example, from the WIKIPEDIA article for the main topic, the WIKIPEDIA article for the connected topic, or from another WIKIPEDIA article. Below the excerpts are links 1420 to the WIKIPEDIA article's page, which opens in a separate window (a new page).

Along the bottom of the FIG. 14 page is a navigation strip or element 1422. Strip 1422 enables users access to other topics (topic elements 1426) connected to the main topic. Clicking on any topic element 1426 displayed in the strip causes the system to replace the connection lightbox (page) with one for the "chosen" connected topics (element 1426). The user also can make the topic of the connection lightbox (i.e. the connected topic) the main topic of a new Connects main page (FIG. 4) by clicking on the "make anchor" banner 1430.

Figure 15:
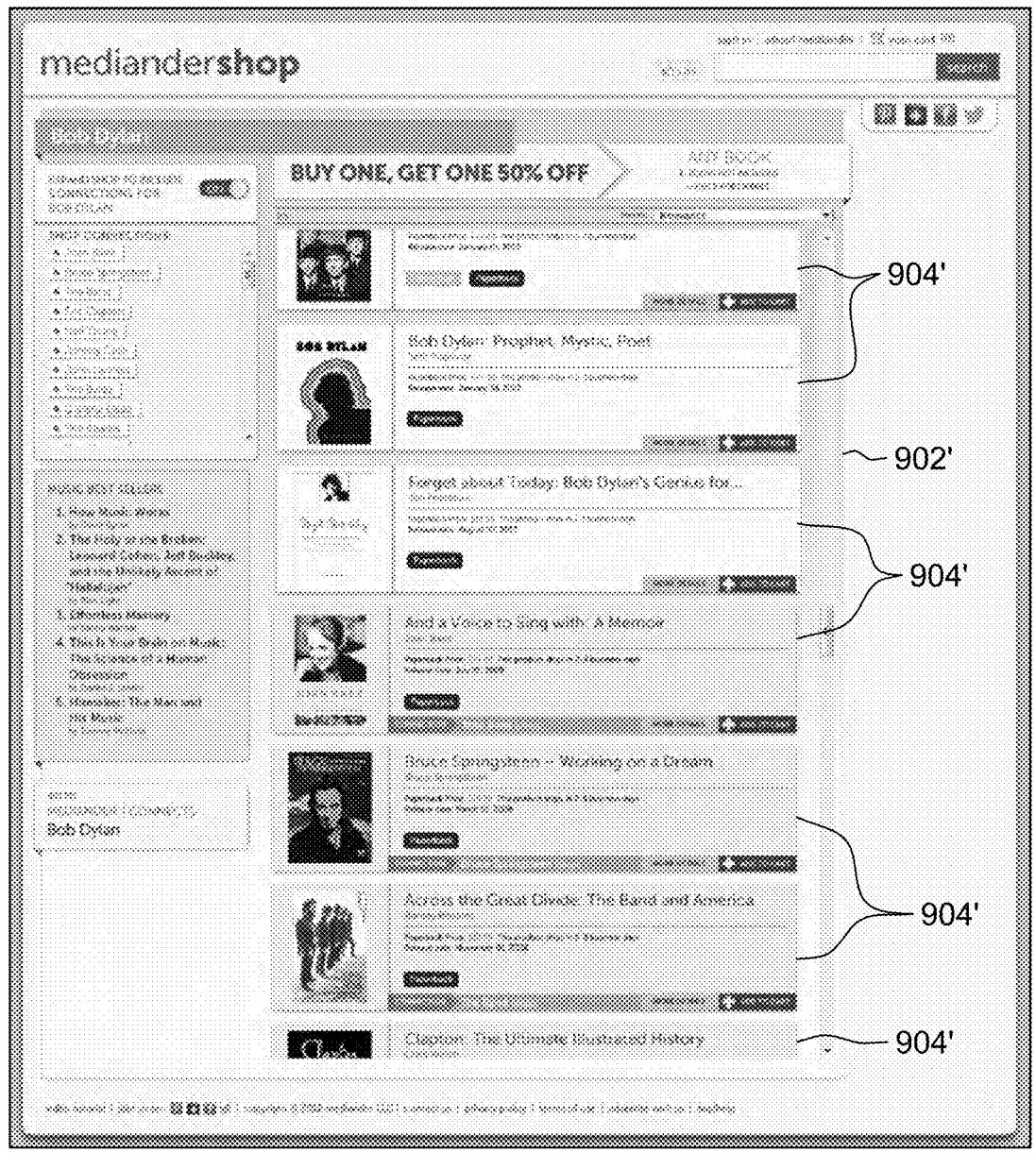
FIG. 15 depicts a Shop (list of products) expanded view.

As mentioned, FIG. 15 depicts a Shop expanded view (to which a user has navigated by clicking the "expand . . . " button 910, such as depicted in FIG. 9). The Shop expanded view adds up to 50 products (elements 904') to the list 902' of available products; the expanded Shop adds up to one product from each of the Shops for each of the 50 connected topics. For example, when expanded, the "Bob Dylan" Shop includes, in addition to the original default list of Bob Dylan products (about 40), the top product from the Joan Baez Shop, the top product from The Band Shop, etc. The display elements 904' for the newly added products show the name of the connected product and offers a link to the connected topic's Shop (such as depicted in FIG. 9). The general functionality of the global navigation links and functionalities (account, search box, shopping cart, etc.) and of social media buttons is available at the top and bottom of the screen.

FIG. 16 depicts the themed subject Shop, which offers the four best products 1602 for each editorially curated relationship 1902 on a themed subject. The themed subject Shop algorithm takes the top two products from each topic's Connects Shop and displays the products four per editorially curated relationship. For example, the editorially curated relationship (FIG. 5, 510) between Harlem and Claude McKay takes the top two Shops function search results for Harlem and the top two Shops function search results for Claude McKay. These four products 1602 are the editorially curated relationship products. The algorithm also filters for duplicates. Clicking on a product thumbnail element 1602 opens the product quickview page or lightbox, such as already described with respect to FIG. 11.

Figure 18:
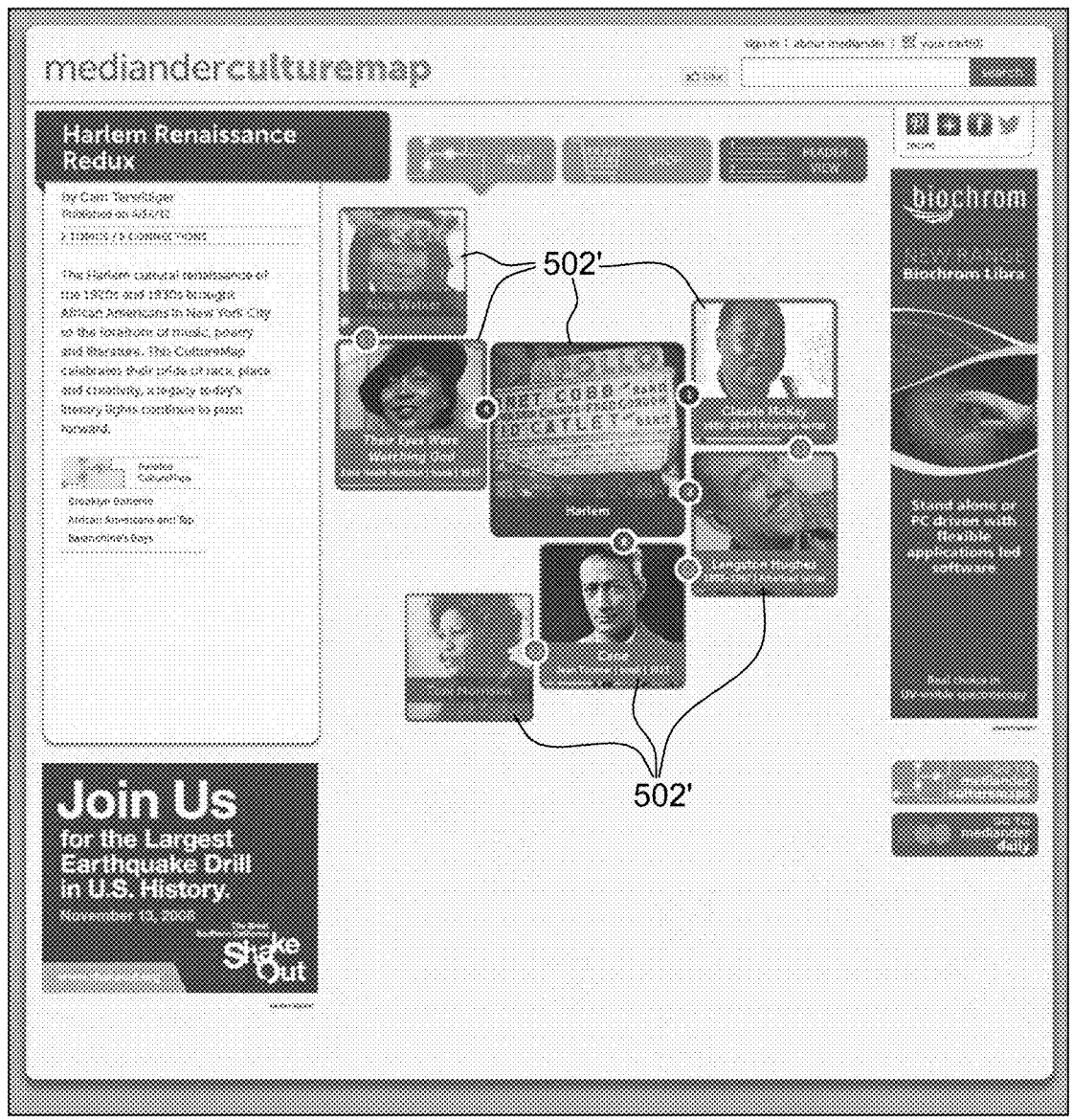
FIG. 18 depicts a page presented in response to users clicking on one of the topics presented in a graphical representation of a themed subject depicted in FIG. 5 page.
Figure 19:
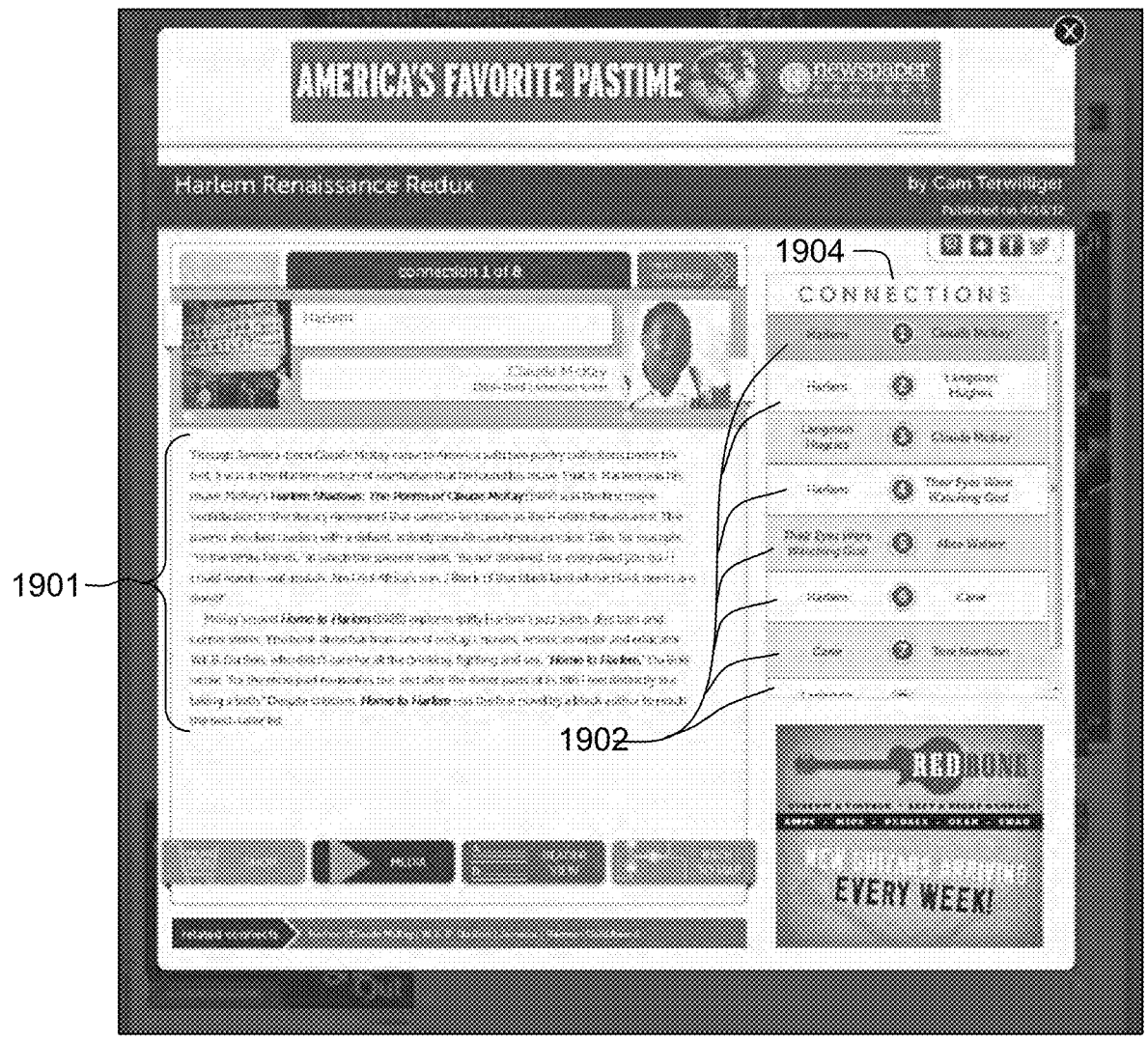
FIG. 19 depicts a themed subject editorially curated relationship (connection) lightbox or page.

As mentioned, FIG. 5, the graphical representation of a themed subject, contains topics 502' and editorially curated relationships 510. Themed subject editorially curated relationship (connection) lightbox or page (FIG. 19) can be accessed from the graphical representation of a themed subject in two ways: First, a user may click on element or button 510 to be taken to the editorially curated relationship (connection) lightbox (FIG. 19) for that editorially curated relationship; second, as shown in FIG. 18, a user may click two joining topics (502'), one after the other, on the graphical representation to be taken to the editorially curated relationship (connection) lightbox for the two topics (FIG. 19). FIG. 18 depicts the graphical representation after one topic has been selected, and before a second one is pressed. Additionally, information ("basic data") is shown for all activated subjects on the graphical representation (see FIG. 18).

The editorially curated relationship lightbox of FIG. 19 contains the principal content concerning the themed subject. This themed subject editorially curated relationship (connection) page enables users to read each individually-authored joining description 1901 on the display interface (e.g., preferably 200 words, or less). A "CONNECTIONS" element 1904 enables navigation from one editorially curated themed subject relationship 1902 to another editorially curated relationship 1902. The "next" and "previous" buttons at the top of the page move through the themed subject's editorially curated relationships, in sequential order to the themed subject's narrative sequence, as indicated by the numbered circles in FIG. 5.

Figure 17:
FIG. 17 depicts a themed subject reader view or page.
Figure 20:
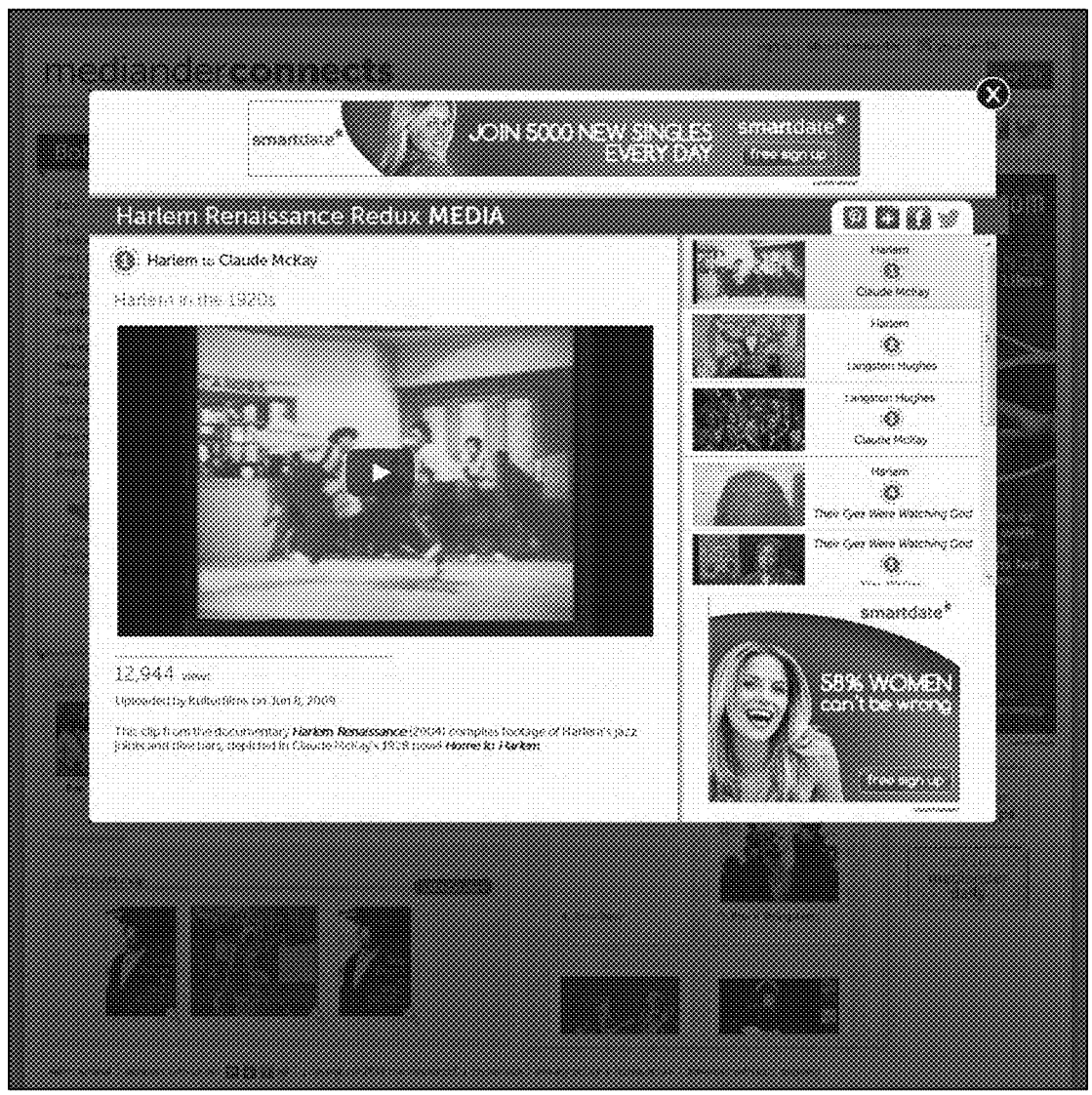
FIG. 20 depicts a themed subject media lightbox or page.

Along the bottom of the FIG. 19 themed subject page are links to: a themed subject Shop, such as that depicted in FIG. 16; a themed subject media lightbox or page, such as that depicted in FIG. 20; a themed subject Reader View, such as that depicted in FIG. 17; the themed subject graphical representation, such as depicted in FIG. 5; and to three editorially chosen "related Connects" topics. Clicking on one of the "related Connects" links would take the user to a Connects main page, such as in FIG. 4. The first two "related Connects" topics for each editorially curated relationship 1902 are the "best match" for the two connected topics. Themed subject topics and Connects topics are conceived independently. When creating the list of "related Connects" for each themed subject's editorially curated relationships, the editors identify the most relevant Connects topic for each of the topics on the themed subjects. In this way, editors make a link between the topics included in the themed subjects (and a graphical representation of same, such as FIG. 5) and the curated topics in the Connects database 212. For example, Bob Dylan on the themed subject about sixties music is identified as the same Bob Dylan topic that is in the Connects database.

FIG. 20 depicts a themed subject media lightbox or page ("Harlem Renaissance Redux MEDIA"), configured to enable users to view and navigate through all the videos chosen for this themed subject (one per editorially curated relationship; video links stored in the ThemedSubjects database 232). Media pages are displayed in a lightbox when the user presses a media button on any editorially curated relationship (connection) page (FIG. 19). The purpose of the media page is to present videos associated with the themed subject's editorially curated relationships. For that matter, the media page has just one state, in which it links to a video or other media file pertaining to one editorially curated relationship, and displays thumbnail images in the right column of the other videos associated with the other editorially curated relationships with the themed subject.

FIG. 17 depicts the themed subject Reader View or page, which offers the user all of a themed subject's editorial content in a single, printable screen (i.e., the content of each of the topics and joining descriptions depicted in the graphical representation). The general functionality of the global navigation links and functionalities (account, search box, shopping cart, etc.) and of social media buttons is available at the top and bottom of the screen. This screen or page also includes links to the themed subject landing page (FIG. 12) and to the home page (FIG. 3).

Figure 21A:
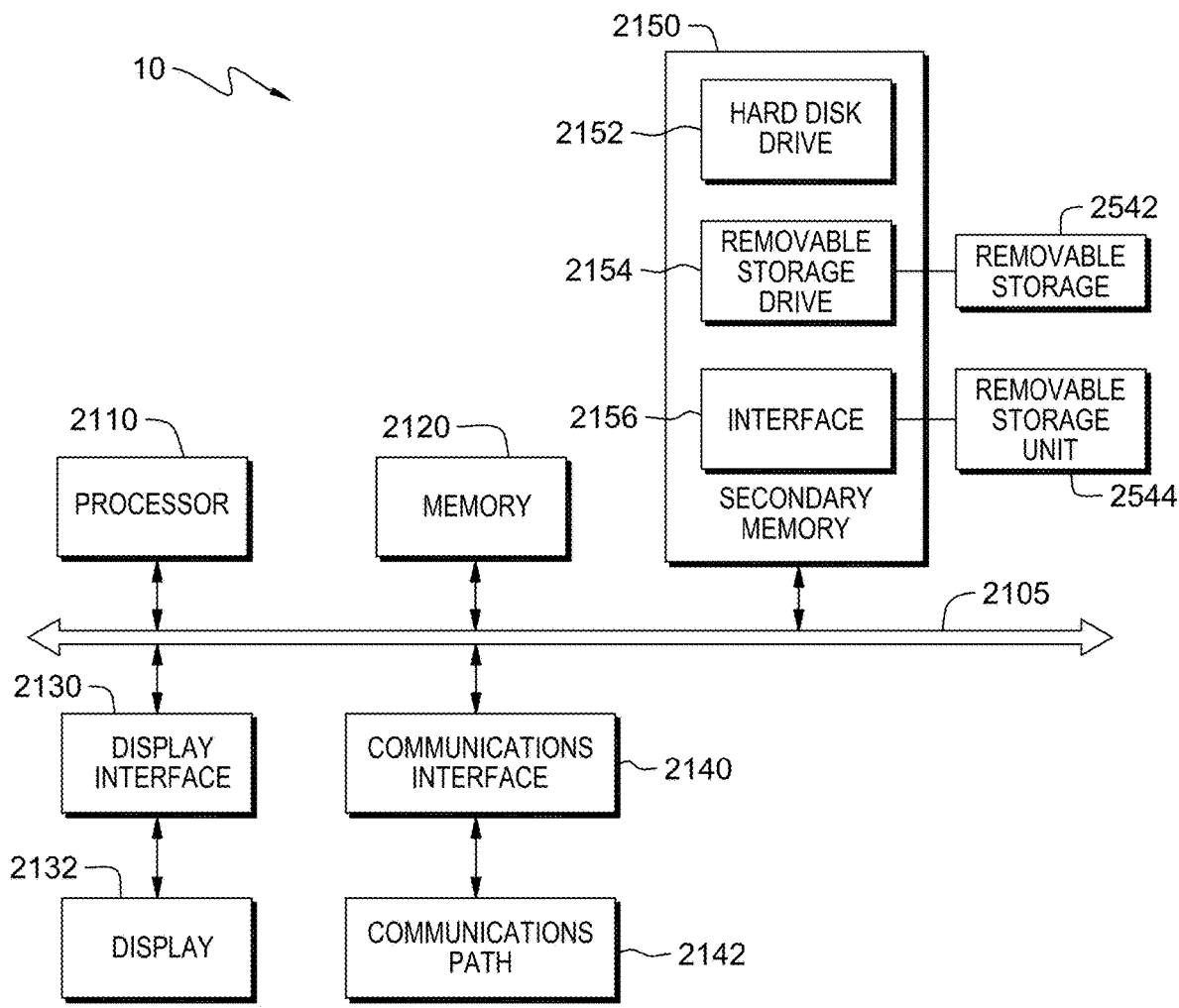
FIG. 21a depicts the server depicted in FIG. 1 in greater detail.

FIG. 21*a* is a schematic diagram depicting the components of computer system/server 10, which can implement the inventive system and method. Computer system/server 10 includes one or more processors, such as processor 2110, which is connected to a bus 2105. Via the bus, the system/server 10 further connects to a display interface 2130 that forwards graphics, text, and other data from the bus or from a frame buffer (not shown) for display on display 2132 (via display interface 2130). Please note that display 2132 may be local or remote (for example, communicated to via Internet 30).

FIG. 21*a* shows system/server 10 to include a main memory 2120, such as random access memory (RAM) and a secondary memory 2150. The secondary memory 2150 may include, for example, a hard disk drive 2152 and/or a removable storage drive 2154, representing a floppy disk drive, a magnetic tape drive, an optical disk drive, flash memory device, etc. The removable storage drive 2154 reads from and/or writes to a removable storage unit 2542. Removable storage unit 2542 represents a floppy disk, magnetic tape, optical disk, flash memory device, etc., which is read by and written to by removable storage drive 2154. The removable storage unit 2542 includes a computer usable storage medium having stored therein computer software, instructions, and/or data. The instructions are executed by system/server 10 or like computer-based devices to carry out the inventive method.

Secondary memory 2150 also may include similar devices for allowing computer programs or other instructions to be loaded into the system/server 10. Such devices may include, for example, a removable storage unit 2544 and an interface 2156. Examples of such may include a program cartridge and cartridge interface (such as that found in video game devices), a removable memory chip (such as an erasable programmable read only memory (EPROM), or programmable read-only memory (PROM)) and associated socket, and other removable storage units 2544 and interface 2156, which allow computer software, instructions, and/or data to be transferred from the removable storage unit 2542 to system/server 10.

System/sever 10 also includes a communications interface 2140 that allows computer software, instructions, and/or data to be transferred between system/server 10 and external devices. Examples of communications interface 2140 may include a modem, a network interface (such as an Ethernet card), a communications port, a Personal Computer Memory Card International Association (PCMCIA) slot and card, etc. Software and data transferred via communications interface 2140 are in the form of signals which may be electronic, electromagnetic, optical or other signals capable of being received by communications interface via a communications path (e.g., channel) 2142. This channel 2142 carries signals and may be implemented using wire or cable, fiber optics, a telephone line, a cellular link, a radio frequency (RF) link, a wireless communication link, and other communications channels.

In this document, the terms "computer-readable storage medium," "computer program medium" and "computer usable medium" are used to generally refer to media such as removable storage drive 2154, removable storage units 2542, 2544, data transmitted via communications interface 2140, and/or a hard disk installed in hard disk drive 2152, referred to broadly as computer program products. The computer program products provide computer software instructions (in a form of a computer program, for example) and/or data to system/server 10. These computer program products also serve to transform a general purpose computer into a special purpose computer programmed to perform particular functions, pursuant to instructions from the computer program products/software. Embodiments of the present invention are directed to such computer program products.

Computer programs (also referred to as computer control logic) are stored in main memory 2120 and/or secondary memory 2150. Computer programs also may be received via communications interface 2140. Such computer programs, when executed, enable the system/server 10 to perform the inventive method. Accordingly, such computer programs represent controllers of the system/server 20. Where appropriate, the processor 2110, associated components and equivalent systems and sub-systems serve as "means for" performing selected operations and functions. Such "means for" performing selected operations and functions also serve to transform a general purpose computer into a special purpose computer that performs said selected operations and functions.

Figure 21B:
FIG. 21b depicts a computer readable medium.

In a software embodiment, the software may be stored in a computer program product, computer readable medium or computer readable device 202 (FIG. 21*b*) and loaded into the system/server 10 using removable storage drive 2154, interface 2156, hard drive 2152, communications interface 2140, or equivalents thereof. The control logic (software), when executed by the processor 2110, causes the processor to perform the functions and methods described herein. Such computer-readable medium may include read only memory (ROM), random access memory (RAM), magnetic disk storage media, optical storage media, or flash memory devices.

Figure 22:
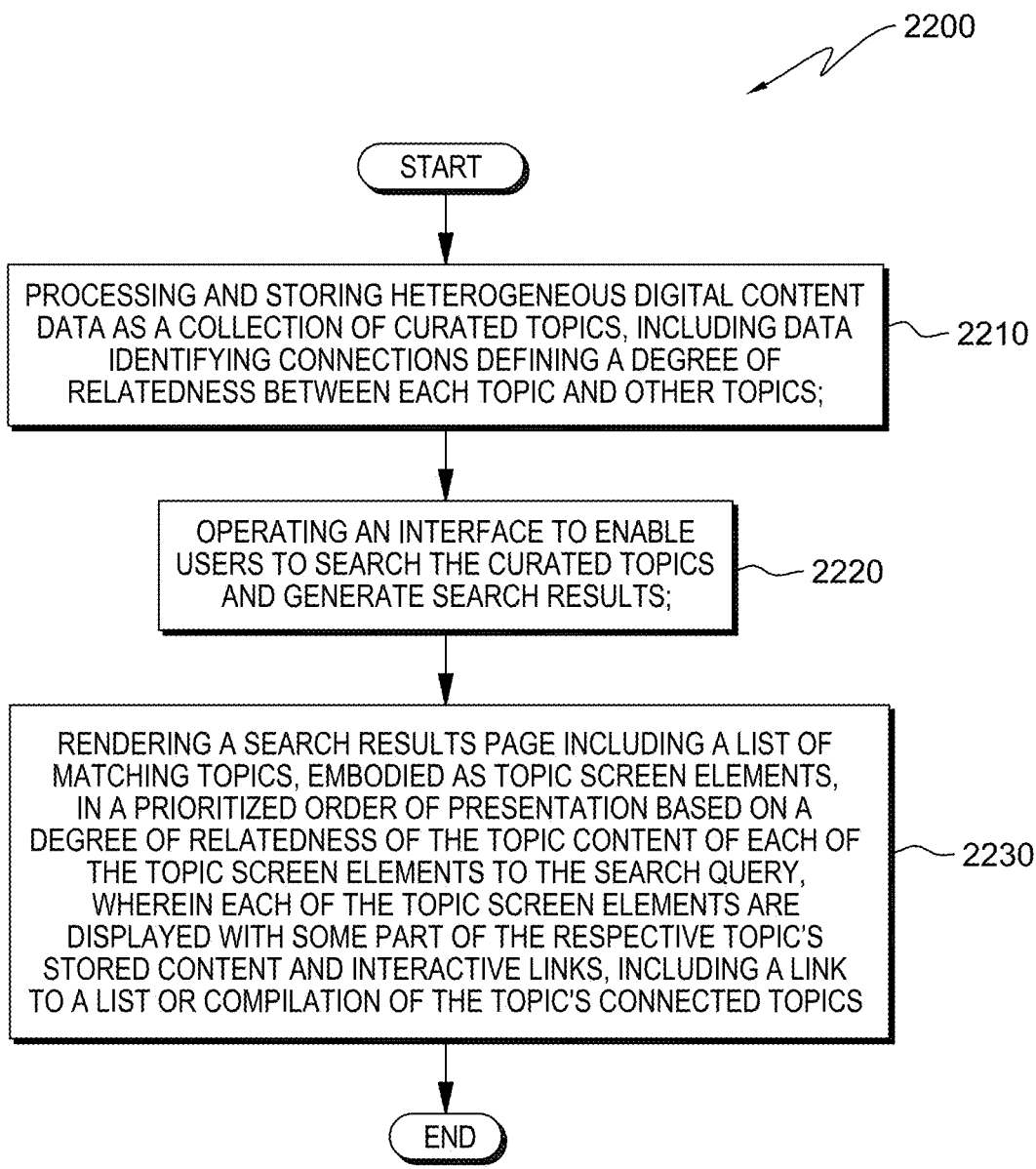
FIG. 22 depicts a flowchart of a method embodiment.

FIG. 22 is a flowchart 2200 depicting one embodiment of a computer-implemented method of operating a user-searchable database system of curated, themed digital content data according to the invention. Block 2210 represents a step of processing heterogeneous digital content data, comprising topics, to realize a collection of topical data records, to identify connections defining a degree of relatedness between topical data records and other topical data records.

Block 2220 represents a step of operating an interface to search the curated content and to generate search results. Block 2230 represents a step of rendering a search results page (FIG. 8) including a list of matching topic screen elements 842, in a prioritized order of presentation based on a degree of relatedness of the topic content to the search query, each topic screen element displayed with some part of the stored topic content and, interactive links, including a link to related topical data records.

The rendering of the search results page (FIG. 8) preferably includes presenting links to other data including multimedia data, if available. The step of "operating . . . to generate" (2230) preferably includes identifying products based on a degree of relatedness to the Connects topic and/or the user's search term, and preferably includes generating a list of themed subjects (850; 852), from a store of themed subject records. The interactive links include a link to product data, and are preferably displayed in a prioritized list reflecting the degree of relatedness (860; 862). The step of rendering themed subjects preferably includes displaying themed subject screen elements in a way that communicates the themed subject's editorially curated relationships, using a graphical representation (FIG. 5). The editorially curated relationships, or joining descriptions, comprise text explaining the relationship between the two topics which are part of a themed subject, wherein the relatedness is based on editorially curated relationships, and wherein the topics are positioned in a display to communicate relatedness.

The step of rendering the Connects topics preferably includes displaying topic data elements in a way that communicates the relationship between the topic and other topics, wherein the degree of relatedness creates a ranking or score, and the positioning of a topic element in a display (a list) to communicate relatedness is based on the ranking/score. The step of searching preferably further includes generating a list of products having a degree of relatedness to the search, and displaying a collection of the product screen elements.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

What is claimed is:

1. A computer-implemented method for searching for content on a desired topic, the method comprising steps of:
   providing heterogeneous digital content data;
   curating the heterogeneous digital content data to generate a collection of curated topics;
   selecting any of a set of pre-prepared themed subjects stored as themed subject records that embody descriptions of editorially curated relationships between a particular subset of the collection of curated topics;
   selecting product data stored as product records or product metadata, in association with the themed subject records;

determining, in the collection of curated topics, a number of times each one of the curated topics is mentioned in each one of the other curated topics;

generating a degree of relatedness score between each one of the curated topics and each one of the other curated topics based in part on the determined number of times each one of the curated topics is mentioned in each one of the other curated topics;

storing the collection of curated topics and the degree of relatedness scores in a database;

receiving a search topic entered on a user interface;

comparing the search topic with the collection of curated topics stored in the database to find curated topics matching the search topic;

displaying a search result page on the user interface, the search result page including a first screen area;

presenting in a first screen area of the search results page, the curated topics matching the search topic, each of the curated topics that match the search topic being embodied as a topic screen element that includes an image relating to the curated topic and text about the curated topic;

listing the topic screen elements in a list in prioritized order based on how closely matched each curated topic of the topic screen elements is to the search topic; and providing each of the topic screen elements in the list with a link to other ones of the curated topics stored in the database which are connected to a corresponding curated topic of the topic screen element based on the degree of relatedness scores stored in the database.

2. The computer-implemented method defined by claim 1, wherein the displaying the search result page further includes presenting links to other data including multimedia data, if available.

3. The computer-implemented method defined by claim 1, wherein the displaying the search result page further includes a second screen area presenting product data, embodied as product match screen elements, in a prioritized order of presentation based on a degree of relatedness of the product data to the search topic.

4. The computer-implemented method defined by claim 3, wherein each of the topic screen elements further includes another link, and wherein activating the other link displays on the user interface a page presenting product data listed in a prioritized order reflecting a degree of relatedness to the curated topic, and once expanded, to the corresponding curated topic of the topic screen element and to one or more connected curated topics.

5. The computer-implemented method defined by claim 1, wherein the displaying includes presenting a page on the user interface displaying a themed subject in a way that communicates the themed subject's editorially curated relationships, using a graphical representation.

6. The computer-implemented method defined by claim 5, wherein the editorially curated relationships included in the graphical representation of the themed subject comprise links to texts describing the editorially curated relationships between connected topic pairs comprising the themed subject.

7. The computer-implemented method defined by claim 5, wherein the displayed themed subject is presented with links to relevant product data.

8. The computer-implemented method defined by claim 7, wherein the product data are presented as screen elements, and wherein the screen elements actively link to a process or function for purchasing a product associated with the product screen element.

9. The computer-implemented method defined by claim 1, further comprising a link to a themed subject related to the topic screen element.

10. The computer-implemented method defined by claim 1, further comprising a link to product data related to the topic screen element.

11. The computer-implemented method defined by claim 10, wherein the product data is filtered by curated topics connected to the corresponding curated topic of the topic screen element.

12. The computer-implemented method defined by claim 10, wherein the product data are presented as screen elements and wherein the screen elements actively link to a process or function for purchasing a product associated with the screen element.

13. The computer-implemented method defined by claim 1, further comprising a step of presenting links to social networking sites or processes that enable a user to upload curated topic data as well as themed subjects and graphical representations related thereto.

14. The computer-implemented method as defined in claim 1, further comprising generating a shop for each curated topic, and wherein each shop comprises product data associated with the curated topic and its connected topics.

15. The computer-implemented method as defined by claim 14, further comprising generating product data screen elements for each product of the shop, and wherein the user interface displays the product data screen elements.

16. The computer-implemented method as defined in claim 14, wherein the shops are displayed in window-like screen elements, in a displayed page, that upon activation by a user cause a products purchase page to be presented that enables the user to purchase a product associated with a screen element selected by the user.

17. The computer-implemented method as defined in claim 1, wherein the shop is based on one of a relatedness of products to the search topic, a relatedness to a disambiguated topic, and a relatedness to the topics within a themed subject.

18. The computer-implemented method defined by claim 1, further including preparing and storing a list of themed subjects embodying descriptions of the themed subjects and of editorially curated relationships among topics comprising the themed subjects.

19. The computer-implemented method defined by claim 18, wherein the themed subjects are prepared from a themed editorial perspective and the editorial perspective defines a theme of a database configured with the themed subjects.

20. The computer-implemented method defined by claim 18, wherein the themed subjects are presented as graphical depictions of a relatedness between topics included in each of the themed subjects.

21. The computer-implemented method defined by claim 20, wherein the graphical depictions of the themed subjects include connective elements linking the topics of a themed subject, and wherein the linking of topics is two-by-two.

22. The computer-implemented method defined by claim 21, wherein the connective elements, upon activation, present a textual description of an editorially curated relationship or connection between two connected topics.

23. The computer-implemented method defined by claim 1, wherein the user interface provides for displaying a home page to receive the user search topic and to present a daily feature element wherein links to topics, themed subjects, shops, and product data are presented as individual screen elements within the daily feature element.

24. The computer-implemented method defined by claim 23, further including a change element within the daily feature element that enables a user to navigate sequentially through thematically related sets of the individual screen elements.

25. The computer-implemented method defined by claim 1, further including presenting links in rendered pages to social media websites or application program interfaces to enable a user to share search results including themed subjects.

26. A computer program product comprising program code means stored on a non-transitory computer-readable storage medium, for carrying out all steps of the method recited in claim 1 when the computer program product is run on a computer or processor-driven device.

27. A database system, comprising:
a hardware processor;
a memory; and
an interface enabling communication by and with the database system;
wherein the memory includes a set of computer-readable instructions that upon execution by the hardware processor implements the method of claim 1.

28. A database system, comprising:
a hardware processor;
a Connects function, executed by the hardware processor, configured to:
provide heterogeneous digital content data;
curate the heterogeneous digital content data to generate a collection of curated topics;
determine, in the collection of curated topics, a number of times each one of the curated topics is mentioned in each one of the other curated topics;
generate a degree of relatedness score between each one of the curated topics and each one of the other curated topics based in part on the determined number of times each one of the curated topics is mentioned in each one of the other curated topics; and
store the collection of curated topics and the degree of relatedness scores in a database;
a user interface function, executed by the hardware processor, configured to:
receive a search topic entered on a user interface;
compare the search topic with the collection of curated topics stored in the database to find curated topics matching the search topic;
display a search result page on the user interface, the search result page including a first screen area;
present in a first screen area of the search results page, the curated topics matching the search topic, each of the curated topics that match the search topic being embodied as a topic screen element that includes an image relating to the curated topic and text about the curated topic;
list the topic screen elements in a list in prioritized order based on how closely matched each curated topic of the topic screen elements is to the search topic; and
provide each of the topic screen elements in the list with a link to other ones of the curated topics stored in the database which are connected to a corresponding curated topic of the topic screen element based on the degree of relatedness scores stored in the database;
a Themed Subjects function, executed by the hardware processor, configured to select any of a set of pre-prepared themed subjects stored as themed subject records that embody descriptions of editorially curated relationships between a particular subset of the collection of curated topics; and
a Shops function, executed by the hardware processor, configured to select product data stored as product records or product metadata, in association with the themed subject records.

29. The database system as set forth in claim 28, wherein the user interface presents the matching curated topics, the themed subjects and the product data as screen elements with active links in various pages generated at run time.

30. The database system as set forth in claim 29, wherein the screen elements include active links to social media websites through which particular topics, themed subjects and product data are uploaded for sharing or public viewing.

31. The database system as set forth in claim 29, wherein the themed subjects to define a perspective on the particular subset of the collection of curated topics and wherein the perspective defines a theme for a system configured to operate with the themed subjects.

* * * * *